Nov. 22, 1955  O. W. DILLON ET AL  2,724,218
SURFACING MACHINES

Filed Aug. 19, 1953  9 Sheets-Sheet 1

INVENTORS
OSCAR W. DILLON
FRANK H. TUTTLE
BY
*Louis L. Gagnon*
ATTORNEY

Nov. 22, 1955     O. W. DILLON ET AL     2,724,218
SURFACING MACHINES

Filed Aug. 19, 1953     9 Sheets-Sheet 3

INVENTORS
OSCAR W. DILLON
FRANK H. TUTTLE
BY Louis L. Gagnon
ATTORNEY

Nov. 22, 1955     O. W. DILLON ET AL     2,724,218
SURFACING MACHINES

Filed Aug. 19, 1953     9 Sheets-Sheet 4

INVENTORS
OSCAR W. DILLON
FRANK H. TUTTLE
BY
Louis L. Gagnon
ATTORNEY

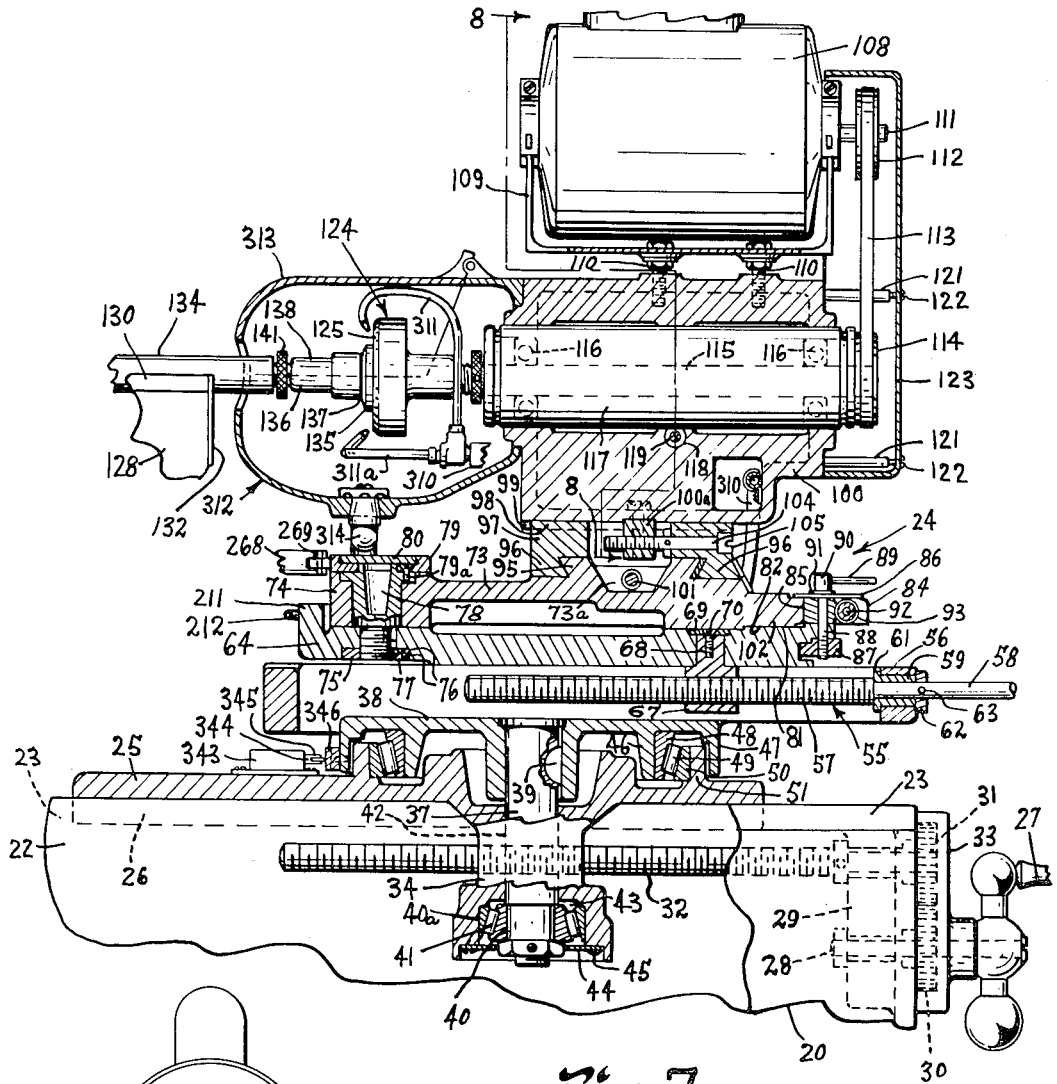

Nov. 22, 1955     O. W. DILLON ET AL     2,724,218
SURFACING MACHINES
Filed Aug. 19, 1953     9 Sheets—Sheet 6
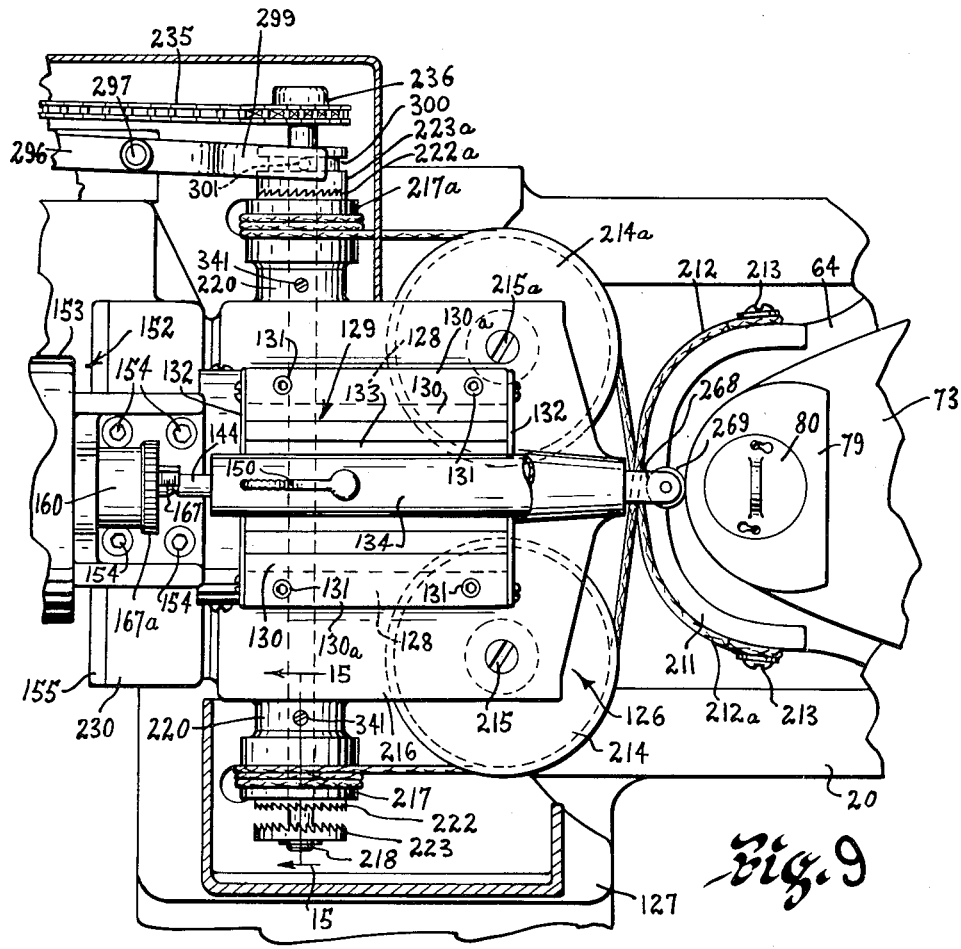
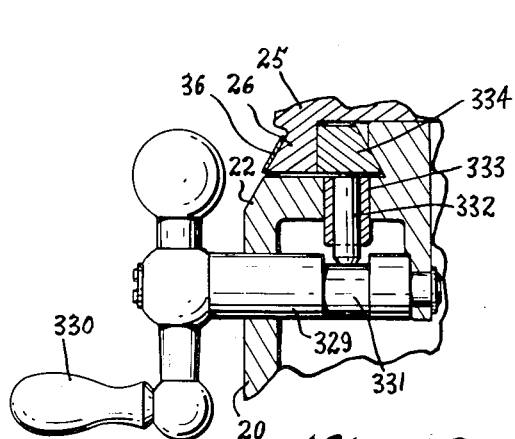
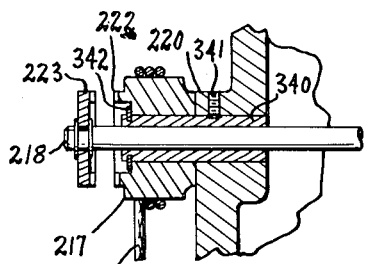
INVENTORS
OSCAR W. DILLON
FRANK H. TUTTLE
BY
*Louis A. Gagnon*
ATTORNEY INVENTORS
OSCAR W. DILLON
FRANK H. TUTTLE
BY
Louis L. Gagnon
ATTORNEY Nov. 22, 1955   O. W. DILLON ET AL   2,724,218
SURFACING MACHINES Filed Aug. 19, 1953   9 Sheets-Sheet 8

INVENTORS
OSCAR W. DILLON
FRANK H. TUTTLE
BY
Louis L. Gagnon
ATTORNEY

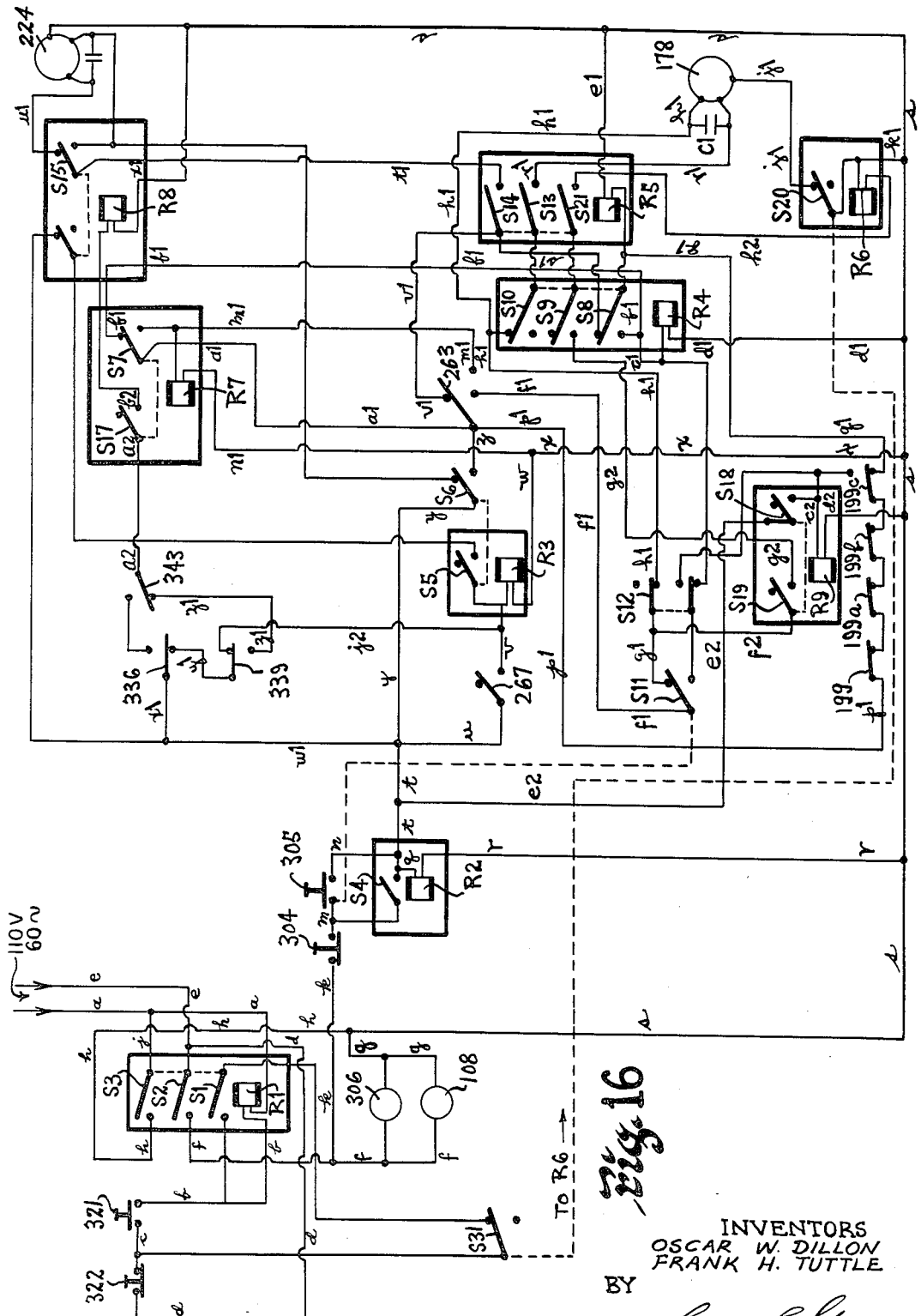

United States Patent Office 2,724,218
Patented Nov. 22, 1955

2,724,218

SURFACING MACHINES

Oscar W. Dillon, Sturbridge, and Frank H. Tuttle, Southbridge, Mass., assignors to American Optical Company, Southbridge, Mass., a voluntary association of Massachusetts Application August 19, 1953, Serial No. 375,242

33 Claims. (Cl. 51—55)

This invention relates to surfacing machines and has particular reference to improved apparatus for producing lenses and similar articles having surfaces of single or compound curvatures.

One of the principal objects of this invention is to provide an improved machine for manually or automatically producing on an article, such as a lens blank, a curved surface of a controlled shape substantially that desired of the finished product and of a texture such as requires only a final polishing operation to complete the finished surface.

Another object is to provide a machine for forming curved surfaces on articles such as lens blanks and having electromechanical means for automatically grinding a surface down to substantially the desired finish size and shape in a relatively short period of time and with a minimum of operations requiring extreme care and manual effort on the part of an operator.

Another object is to provide a machine of the above character having improved means for supporting an article to be abraded and for manually or automatically advancing the article controlled amounts into an abrading tool in accordance with the amount of material to be removed from the surface thereof.

Another object is to provide a machine of the above character having improved means for supporting a rotatable abrading tool and for automatically feeding said tool transversely of the article to abrade a surface thereon of a single or compound curvature, said curvature or curvatures depending upon the angle at which the abrading tool is disposed relative to the article and the radius of curvature about which the tool is moved transversely of the article.

Another object is to provide a surfacing machine of the above character wherein the tool is automatically successively swept transversely of the article to remove material from the surface thereof and the article is automatically intermittently fed into the tool in accordance with the amount of material to be removed from the surface of the article during each transverse sweep of the tool, this procedure being performed the required number of times necessary to abrade the surface down to the required size and shape.

Another object is to provide a surfacing machine of the above character with means for maintaining a substantially constant rate of feed of the tool across an article during an abrading cycle, and consequently maintaining a controlled unit pressure upon the abrading tool, regardless of the depth of cut or the radius of curvature being generated, whereby the diamonds or other abrading elements of the tool more lastingly retain their cutting efficiency and resultant breakage of articles is materially reduced.

Still another object is to provide a surfacing machine wherein an abrading tool is automatically fed transversely of an article in one direction and may be subsequently fed transversely of the article in the opposite direction, thus obtaining more even distribution of wear on the abrading tool.

A further object is to provide an automatic surfacing machine which embodies novel control means whereby the machine will successively automatically perform a predetermined number of abrading operations on the surface of an article in accordance with the initial adjustments of the control means and whereby the article will be successively and intermittently advanced toward the abrading tool in accordance with other initial adjustments of the control means.

A still further object is to provide safety means for controlling the tension on the means for automatically moving the abrading tool transversely of the article whereby if some condition should arise to prevent such movement of the tool the possibility of damage or breakage resulting therefrom is greatly reduced.

A still further object is to provide apparatus which may be applied to a conventional surfacing machine with slight modification of the machine to convert it from a manually operable type to a fully automatic type.

Other objects and advantages of the invention will become apparent from the following description taken in connection with the accompanying drawings, in which:

Fig. 7 is a vertical sectional view through the tool-supporting head mechanism;

Fig. 8 is a vertical sectional view taken substantially on line 8—8 of Fig. 7 looking in the direction indicated by the arrows;

Fig. 9 is an enlarged fragmentary top elevational view partly in section of the work-supporting device and adjacent parts of the tool-supporting means;

Fig. 12 is an enlarged fragmentary vertical sectional view through the locking device for the tool-supporting head slide;

Fig. 15 is a fragmentary vertical sectional view through one of the clutches; and Fig. 16 is a schematic diagram of the electrical circuits.

Figure 1:
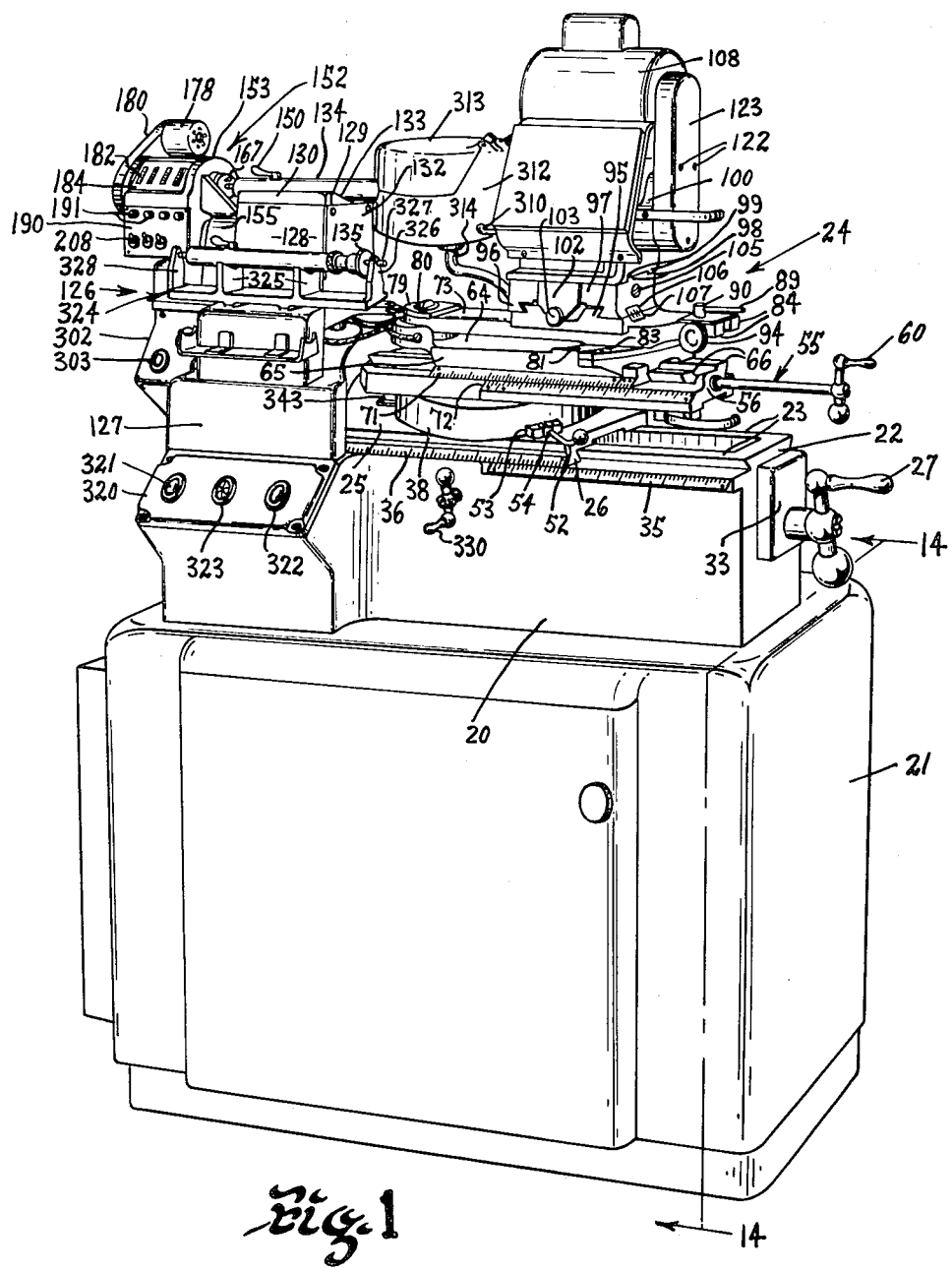
Fig. 1 is a front perspective view of a surfacing machine embodying the invention.

Prior to the present invention it has been the usual practice to reduce lens blanks or articles of a similar nature to substantially the finished thickness desired just prior to performing the final polishing or other finishing operation of the surface thereon by hand abrading operations or by relatively slow mechanical methods. Hand abrading methods are, of course, slow and undesirable. However, prior mechanical abrading methods, while a substantial improvement upon hand abrading methods, have generally required considerable care and attention by an operator during an abrading operation. In most known prior art machines it has been necessary for an operator to perform intricate manual control adjustments during an abrading operation to cause successive engagements between the tool and work to finally provide the work with the desired resultant surface. Also, many known machines are constructed in such a manner that a tool is caused to sweep across the work in one direction during an abrading operation and then must be manually returned to initial starting position before a second sweep can be performed. This not only requires manual effort by an operator but also causes wear of the tool only in selected areas since an abrading operation is thus always performed while the tool is swept across the work in a single direction. Known prior art machines also do not embody means for constantly maintaining a predetermined controlled unit pressure upon the abrading tool. Tools having abrading particles such as diamond chips embedded therein are known to wear much more quickly and the articles being abraded are found to break more frequently than would be the case where a constant controlled unit pressure is maintained.

The present invention overcomes the above and other undesirable features of the prior art by providing a machine which performs automatically many of the functions which are performed manually by known prior art surfacing machines. The presently described machine embodies control means which may be initially set in accordance with the total amount of material to be removed from an article and the number of sweeps of the tool across the work which are necessary to provide a surface of the article with the desired resultant shape. The actual complete abrading operation which embodies successively sweeping the tool across the work and advancing the work predetermined distances into the tool for each sweep thereof may be performed automatically or the advancing movement of the work may be done manually and the sweeping action done automatically if desired. In addition the tool is caused to abrade in both directions of sweep which not only preserves the tool but also speeds up the overall generating cycle. Also, means is provided for maintaining a relatively constant unit pressure upon the tool which results in increased efficiency of the tool and less chipping or breakage of articles being abraded.

The present machine embodies a single cup-type abrading tool which is arranged so that an abrading edge thereof will be disposed at a predetermined angular relation to the work in accordance with the radius of curvature to be provided on the article in one major meridian, the radius of curvature in the opposed major meridian being dependent upon the radius along which the abrading edge of the tool is moved as it sweeps across the work. Thus, a surface of single or compound curvatures may be quickly and easily generated.

With an automatic machine of the present type, while one article is being abraded the operator is free to perform other duties such as attaching another article to supporting means therefor which may thereafter be quickly and easily attached to the machine so as to position the article carried thereby in abrading position for a subsequent abrading operation.

Referring more particularly to the drawings wherein like characters of reference designate like parts throughout the several views, the machine embodying the invention in its preferred form comprises a hollow base 20 which may form a part of or be set upon a suitable support such as a pedestal or cabinet 21. The upper portion of the base 20 forms a bed 22 which is provided on its upper surface with spaced tracks or guideways 23 on which is slidably located the tool-supporting head mechanism 24.

Tool-supporting mechanism

The head mechanism 24 is provided with a supporting plate 25 having spaced tracks 26 on its under side adapted to interfit with the tracks or guideways 23, the engaging surfaces of the tracks 23 and 26 being machined so that the head mechanism 24 may be moved on the tracks 23 with ease and precision. The means for slideably moving the head mechanism 24 on the tracks 23 includes a manually operable handle member 27 rotatably mounted by its shaft 28 (Fig. 7) in a bracket 29 formed on the inside of the wall of the base 20, the shaft 28 carrying a gear wheel 30 adapted to mesh with a gear wheel 31 positioned on the end of a transversely disposed threaded shaft 32. A gear box 33 is suitably positioned on the end of the base 20 to cover the gear wheels 30 and 31. The threaded shaft 32 has a bearing in the bracket 29 near the end thereof which carries the gear 31 and is adapted to threadedly engage a portion of a tubular depending member 34 formed integral with the under side of the supporting plate 25. Thus, by manual rotation of the handle 27 the entire head mechanism 24 can be moved longitudinally of the bed 22 on the tracks 23. A scale 35 graduated in millimeters is fixedly secured to the edge of the front track 23 on the bed 22 and has its reading edge aligned with an index mark on the reading edge of a scale 36 graduated in diopters, which scale in turn has its reading edge aligned with an index mark on the millimeter scale 35, the dioptic scale being secured to the outer edge of the forward track 26 on the supporting plate 25. By this means the extent of the sliding movement of the head mechanism 24 on the bed 22 may be determined.

The entire tool-supporting head mechanism 24 with the exception of the supporting plate 25 may be rotated about a given axis on a pivot post 37, see Fig. 7, which has its upper end positioned in a vertical opening in a base plate 38 and held from rotation therein by a key member 39. The post 37 is headed at its upper end and has mounted upon its lower end the inner race 40 of a roller bearing unit 41, the post 37 being rotatable within a vertical opening 42 in the tubular depending member 34 formed on the supporting plate 25. The roller bearing unit 41 has its outer race 40a located on the inner wall of an enlarged opening 43 in the tubular member 34 and concentric with the opening 42, and thereby provides means whereby the base plate 38 and the head mechanism mounted thereon may easily and unrestrainedly rotate. A washer-like member 44 is secured by means such as screws 45 over the end of the depending member 34 and serves to prevent dirt, dust, etc., from gaining access to the bearing unit 41.

The base plate 38 is formed with downwardly extending spaced inner and outer annular flanges 46 and 47 respectively, the inner flange 46 being adapted to engage the inner race 48 of a roller bearing unit 49, the outer race 50 of the bearing unit 49 being adapted to snugly reside within an upwardly extending flange 51 formed on the supporting plate 25. This roller bearing unit 49 serves to minimize friction between the base plate 38 and the supporting plate 25 when the base plate is rotated.

The base plate 38 may be prevented from rotating and locked in desired adjusted axial position by means of a friction lock 52 (Fig. 1) comprising a cam member 53 rotatably mounted by means of a stud 54 on the supporting plate 25 adjacent the base plate 38. The handle portion of the lock 52 is adapted to be manually rotated to cause the cam member 53 to frictionally engage the outer edge surface of the base plate 38 to render it immobile.

The upper portions of the head mechanism 24 may be moved longitudinally with respect to the base plate 38 by means of an operating shaft 55 which is adapted to extend through an opening in one end of a hollow table 56 formed integral with the upper surface of the base plate 38. The shaft 55 is provided with a threaded portion 57 which is adapted to be entirely positioned within the table 56 and an unthreaded end portion 58 of smaller diameter than the threaded portion 57 which extends out through the end of the table 56. The end portion 58 of the shaft 55 is rotatably mounted in a bushing 59 located in the opening in the end of the table 56, the rotary movement thereof being manually controlled by a handle 60. The bushing 59 is formed with a flanged portion 61 which is adapted to engage the inner surface of the end wall of the table 56. A stop plate 62 engaging the outer surface of the table 56 is secured to the unthreaded shaft portion 58 as by a pin 63, the flange 61 and stop plate 62 functioning cooperatively to prevent longitudinal displacement of the shaft 55. Mounted on the table 56 is a slidable base member 64 having tracks 65 formed longitudinally on its lower surface, the tracks 65 being adapted to slidably engage tracks 66 formed on the upper surface of the table 56. An operating member 67 (Fig. 7) is secured to the under side of the base member 64 and is provided with an upwardly extending portion 68 which is positioned within a vertical opening in the base member 64 and held immovable therein by a retaining plate 69 and screw 70. The operating member 67 has a longitudinally threaded opening for reception of the threaded portion 57 of the operating shaft 55. Thus, by operation of handle 60, consequent rotation of shaft 55 will cause the base member 64 and the parts of the head mechanism mounted thereon to slide longitudinally of table 56 on tracks 65 and 66, the engaging surfaces of the tracks 65 and 66 being machined similar to tracks 23 and 26 to provide the precision of movement of the sliding base member 64. A diopter scale 71 is secured to the edge of the front track 65 and a cooperating millimeter scale 72 is secured to the adjacent edge of the table 56 and are adapted to be read similar to the scales 35 and 36 respectively except that the scales 71 and 72 are graduated reversely to the graduations on the scales 35 and 36.

A quadrant-shaped plate 73 is mounted on the upper surface of the base member 64 and is adapted to pivot about an axis formed by a headed pivot stud 74 (Fig. 7 which is located in a vertical opening near one end of the quadrant-shaped plate 73. The pivot stud 74 has a threaded downwardly extending portion which is disposed in a concentric opening in the base member 64, which opening has an enlarged lower portion for reception of a lock nut 75 which is threaded onto the threaded lower end of the stud 74. The nut 75 has vertically arranged bifurcations 76 which are connected by a screw 77 in such a manner that when the screw 77 is tightened the bifurcations 76 will tend to abut and thus will lock the nut 75 on the end of the pivot stud 74 to hold the stud in place. A vertical opening 78 is provided in the pivot stud 74 for insertion of an alignment member (not shown) which is used to control the spacing between the pivot stud 74 and an abrading tool when setting up the machine for an abrading operation as will be hereinafter described. Since it is important that the opening 78 as well as the pivot stud 74 should be protected, an apertured switch control plate 79 is secured to the quadrant-shaped plate 73 as by screws 79a in overlying relation to the stud 74 and a closure member 80 is removably positioned in the aperture therein.

The upper surface of the base member 64 has an arcuate machined surface portion 81 corresponding to a similar adjacent surface portion 82 (Fig. 7) formed on the underside of the quadrant-shaped plate 73. This provides constantly accurate positioning of the plate 73 on the base member 64, the base member 64 also being provided with a graduated scale 83 (Fig. 1) so that the amount of rotary movement of the quadrant-shaped plate 73 with respect to the base member 64 may be indicated when the plate 73 is adjusted about the axis of stud 74.

The outer end of the plate 73 is provided with a pair of spaced bifurcations 84 between which is positioned a movable block 85, the block 85 being adapted to engage the upper surface of the base member 64. A cover plate 86 covers the upper sides of the bifurcations 84 and the block 85, and a clip 87, carried by a clamp shaft 88, which extends downwardly through concentric openings in the cover plate 86 and block 85 and end portion of the base member 64, is adapted to engage the under side of the base member 64. The clamp shaft 88 is threaded into the clip 87 and has an enlarged upper end portion 90 carrying a handle 89. The shaft 88 is provided with a peripheral flange 91 engaging the outer surface of the cover plate 86 whereby upon manual manipulation of handle 89 the shaft 88 can be turned to tighten the clip 87 against the base member 64 to provide clamping action thereupon cooperatively with the flange 91, block 85 and cover plate 86.

To perform a major change in adjustment of the quadrant-shaped plate 73 on the base member 64, the clamp is operated to release the pressure upon the block 85 and clip 87, permitting the plate 73 to be manually swung upon the pivot stud 74 to a position approximate the final adjustment desired as indicated by scale 83. The clamp may then be again manipulated to move the block 85 and clip 87 into clamping engagement with the opposed surfaces of the base member 64 to prevent undesired further movement of the plate 73 and to retain the plate in adjusted position.

To obtain a final adjustment of the quadrant-shaped plate 73 on the base member 64 there is provided an operating shaft 92 (Fig. 7) which is horizontally disposed and adapted to extend through and rotate in both bifurcations 84 of the quadrant-shaped plate 73. The shaft 92 carries a worm gear 93 which is adapted to mesh with teeth formed on the outer surface of the block 85, and a knurled knob 94 (Fig. 1) is located on the end of the shaft 92 for manual operation of the device. Thus, since the block 85 is immovably positioned on base member 64, when the knob 94 is turned to rotate the shaft 92 and worm gear 93 the action of the gear 93 upon the block 85 will cause the bifurcations 84 and consequently the quadrant-shaped plate 73, as well as the portions of the head mechanism mounted thereon, to move slidably about the axis of the pivot stud 74, thereby providing the final adjustment of the position of the quadrant-shaped plate 73 with respect to the base member 64.

The upper surface of the quadrant-shaped plate 73 carries an integral transversely extending set of tracks or guideways 95 which are adapted to slidably support interfitting tracks 96 formed on the underside of a slide 97, the slide 97 being provided on its upper surface with longitudinally extending guideways 98 (Fig. 1) which in turn slidably receive tracks 99 which are formed on the underside of a spindle-supporting slide member 100.

The quadrant-shaped plate 73 is provided in its upper surface between the tracks 95 with a longitudinally extending web 73a which is provided with a threaded opening in which is located a threaded shaft 101. The outer end of the shaft 101 is carried by a plate 102 which is fixedly attached to the slide 97 whereby a knob 103 mounted on the end of the shaft 101 may be rotated to cause the slide 97 to move longitudinally of the tracks 95. A screw 104 is likewise carried by the slide 97 and extends longitudinally of and between the tracks or guideways 98 and is adapted to threadedly engage a block 100a which is secured to the underside of the spindle-supporting side member 100. The screw 104 is provided with a slotted head 105 by means of which the screw 104 may be rotated to adjust the slide member 100 on the slide 97. A collar 104a is pinned to the screw 104 adjacent the inner surface of the wall of the slide 97 and functions to prevent longitudinal displacement of the screw 104.

The amount of movement of the slide 97 on the quadrant-shaped plate 73 is indicated by adjoining scales 106 and 107 located on the outer surfaces of one pair of tracks 95—96.

Secured to a platform formed on the upper side of the slide member 100 is a motor 108 (Figs. 7 and 8), the motor 108 being attached by a motor bracket 109 and studs 110 to the slide member 100. The motor shaft 111 has a pulley 112 fixedly mounted thereon which is in turn operatively connected as by a belt 113 to a pulley 114 which is secured to one end of a spindle 115, the spindle 115 being rotatably mounted in bearings 116 carried by a spindle housing 117 located in the spindle-supporting slide member 100. The spindle housing 117 and spindle 115 extend longitudinally of the machine parallel with the tracks 65—66 and tracks 98—99.

The spindle 115 and spindle housing 117 are preassembled and subsequently mounted on the slide member 100 as an assembled unit. Within the slide member 100 and immediately beneath the longitudinal opening therein for receiving the housing 117 is provided a transversely extending opening in which are positioned a pair of slidable clamping members 118 and 118a. One of the clamping members 118—118a carries a freely rotatable stud 119 therein and the other clamping member is provided with a threaded opening 120 for receiving a threaded end portion of the stud 119. Thus, when the assembled spindle unit is properly located in the slide member 100, the stud 119 is rotated to cause the slidable clamping members 118—118a to be drawn toward one another and into frictional engagement with the spindle housing 117 as shown in Fig. 8. This will retain the spindle unit in desired assembled relation with the spindle-supporting slide member 100.

It will be noted here that one end of the spindle-supporting slide member 100 is provided with outwardly extending lugs 121 (Fig. 7) to which are connected the screws 122 by which a cover 123 is mounted over the belt 113 and pulleys 112 and 114 as a protective guard.

The opposed end of the spindle 115 has suitably secured thereto a cupped or ring type abrading tool 124. The tool 124 is preferably of a diamond impregnated or charged type and has its abrading portion 125 provided with a convexly curved cross-sectional shape.

Work supporting mechanism

Mounted on the base 20 adjacent the tool-supporting head mechanism 24 is the work-supporting head mechanism 126 which is adapted to carry the work to be abraded. The work-supporting head mechanism includes a base 127 (Figs. 1 and 2) which is provided at its upper end with a pair of spaced uprights 128 between which is carried a chuck 129, the chuck 129 being of any suitable conventional type, preferably magnetic. The chuck 129 has supporting members 130 secured to each side thereof and which have flanges 130a on their upper ends which are adapted to overlie the upper surface of the uprights 128 and to be secured thereto by means of screws 131 (Fig. 9). For appearance, suitable cover plates 132 (Fig. 1) may be secured as by screws or the like over the ends of the chuck 129 and uprights 128.

The chuck 129 has formed in its upper side a longitudinal V-groove 133 having its opposed surfaces precision machined so that a work carrying spindle 134, when disposed in the V-groove 133, will extend in a true predetermined position in a direction longitudinally of the machine and parallel with the longitudinal tracks 23—26. Thus, a spindle 134, or another similar spindle, may be removed or replaced in the V-groove 133 without the requirement of any realigning operations to locate the spindle accurately in the original position in the V-groove.

The chuck 129 illustrated in the drawings is of the permanent magnetic type and may be provided with any suitable conventional means for controlling the "on" and "off" magnetic condition of the chuck 129 whereby when in "on" condition the chuck will attract the spindle 134 in such a manner that the spindle will be fixedly retained in the V-groove 133 until such a time as the chuck is converted to "off" condition whereupon the spindle may be readily removed.

Figure 2:
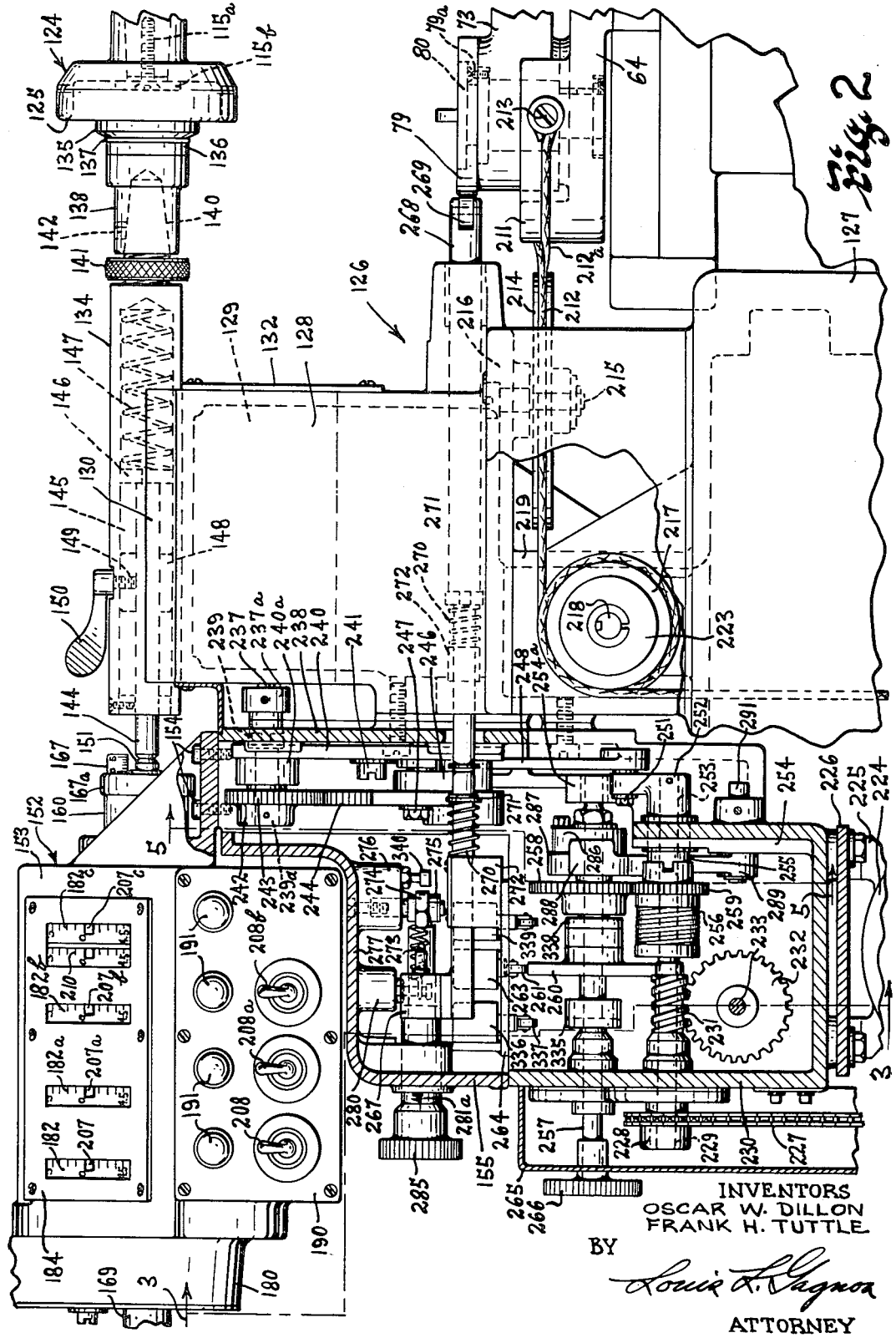
Fig. 2 is an enlarged fragmentary front elevational view partly in section of the work-supporting and advancing mechanism, the chuck control mechanism, the clutch shifting mechanism and the automatic tool feed control.
Figure 13:
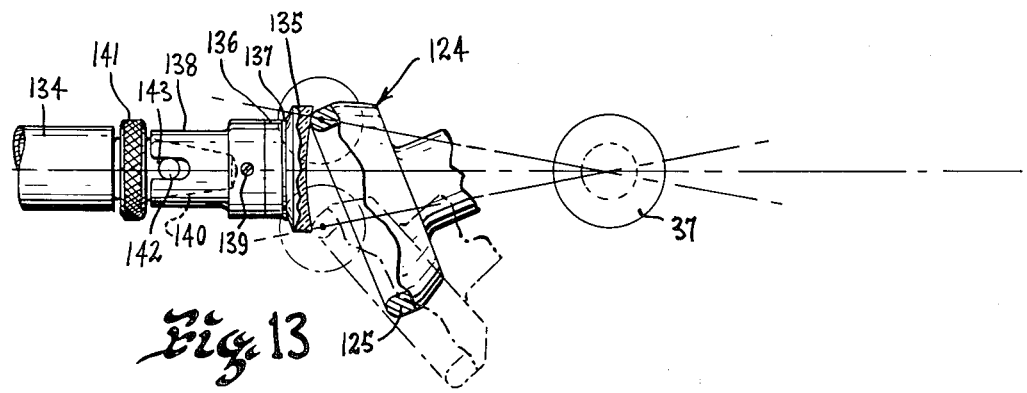
Fig. 13 is a diagrammatic top plan view illustrating positions of an abrading tool with relation to an article being abraded during a surfacing operation.

The work to be abraded such as a lens blank 135 is adapted to be carried by the spindle 134 and is adhesively secured to a block 136 by means of a layer of pitch or other suitable adhesive 137 (Figs. 2, 7 and 13). The block 136 is secured to an adaptor 138 by adjusting screws 139, the adaptor 138 being adapted to set snugly upon the tapered shank portion 140 of the reduced end of the spindle 134. The shank portion 140 is threaded to receive a knurled nut 141 between the end of the adaptor 138 and adjacent end of the larger portion of the spindle. Thus, by turning the nut 141 in the proper direction an operator can easily force an adaptor 138 off the shank portion 140 of the spindle 134.

The shank portion 140 is also provided with an outwardly extending locating pin 142 which is adapted to be positioned in a slot 143 formed in the adaptor 138. Thus, the axis of the lens blank 135 can be located in a known relation with respect to the spindle 134.

When the spindle 134 carrying a lens blank 135 is properly located in the V-groove 133 of the chuck 129, the lens blank 135 will be positioned adjacent the tool 124 so that as the tool, during an abrading operation, is caused to sweep in an arc about the axis of the pivot post 37 it will engage the exposed surface of the lens blank 135 and will abrade the surface to the desired depth.

The spindle 134 is comprised of an elongated bar-like member having a longitudinal bore 145 formed therein (Fig. 2). Within the bore 145 is positioned a slidable contact member 144 having one end thereof extending outwardly of the end of the spindle 134 and having its opposed end carrying a disc 146 which engages one end of a spring 147 located in the inner end of the bore 145. The spring 147 functions constantly to urge the contact member 144 in a direction outwardly of the bore 145. A collar 148 is mounted over the contact member 144 within the bore 145 and carries a threaded pin 149 which extends outwardly through an opening provided therefor in the wall of the spindle 134. On the outer end of the pin 149 is a clamp arm 150 which can be manually turned to thread the pin 149 inwardly into engagement with the contact member 144. Thus, the contact member 144 may be locked and held immovably in adjusted position in the bore 145.

Setting up procedure

In setting up the machine to generate a curved surface on the lens blank 135, the tool of the desired size is first attached to the tapered end of the tool spindle 115 by means of a threaded bolt 115a and washer 115b (Fig. 2). The abrading tool 124 is then adjusted to the desired distance from the axis of the pivot post 37 to control the arc of the curve to be generated in the horizontal meridian of the lens blank 135. This is accomplished by first operating the handle 127 to cause the supporting plate 25 to be slidably moved on the bed 22 to an extent as indicated by the scales 35 and 36. For example, if a six diopter curve is to be generated on the surface of the lens blank 135, the supporting plate 25 will be slidably moved on bed 22 to a position where the scales 35—36 will indicate that a curve of six diopters will be generated. Then the handle 60 is operated to slidably move the base member 64 and the parts of the head mechanism mounted thereon longitudinally of the table 56 on the tracks 66 to a position where the scales 71 and 72 will render an indication similar to the scales 35 and 36.

This latter adjustment is a compensating adjustment which initially enables the tool to be adjusted in a direction away from the work an amount sufficient to permit the scale settings to be made on the scales 35 and 36. The tool may then be moved toward the work and to the position as determined by the scales 71 and 72.

The tool is then aligned with respect to the axis of the pivot stud 74 to locate the tool in final abrading position. This is done by removing the closure member 80 from its position covering the opening 78 in the pivot stud 74 and inserting in the opening a gauge (not shown) which is adapted to extend upwardly from the pivot stud 74. The tool 124 is then moved so as to position its abrading surface in engagement with the gauge whereupon the center of curvature of the curved abrading surface of the tool 124 will be automatically aligned with the axis of the pivot stud 74. To move the tool into engagement with the gauge it is necessary only to turn the adjusting screw 105 whereupon the motor 108, spindle 115 and tool 124 may be moved longitudinally of the machine until the tool is in desired contact with the gauge. It is to be understood that the center of the curved surface of the tool 124 should be adjusted so as to be coaxial with the axis of the pivot stud 74. The longitudinal adjustment accomplished by screw 105 therefore provides means for compensating for wear of the surface of the cutting edge of the tool and this feature should be checked periodically so that as the cutting edge of the tool 124 is worn down this wearing action may be compensated for so that articles such as optical lens blanks will be surfaced accurately.

It is particularly pointed out that the curve which is generated will be of a concave or negative form and the radius of curvature is dependent upon the distance at which the cutting edge of the tool 124 is adjusted with respect to the longitudinal axis of the pivot post 37. This arrangement, therefore, provides for various differently controlled curves to be formed in the horizontal meridian. The curve generated in the vertical meridian of the lens blank or other articles to be surfaced is controlled by the angling of the tool 124 relative to the position which the longitudinal axis or plane of the blank assumes when supported in operative relation with respect to the tool. This is accomplished by loosening the clamp 89 and adjusting the quadrant-shaped plate 73 upon the base member 64 about the axis of the pivot stud 74. After adjusting the quadrant-shaped plate 73 to the approximate desired position as indicated by the scale 84, the clamp 89 is tightened and the knob 94 is then operated to obtain the finer adjustment necessary to position the quadrant-shaped plate 73 exactly as desired.

If the curve to be generated on the lens blank 135 or other article is to be a single spherical type curve, the tool 124 is angled so as to generate a curve in the vertical meridian of the lens blank which corresponds in radius to the curve generated by the swing of the tool in a horizontal direction about the axis of the pivot post 37. The two curves, therefore, will be of the same radius and will thereby generate a single spherical curve. If the surface is to have a compound curvature, then the adjustments are made so as to introduce the different radii of curvature desired in the respective vertical and horizontal meridians.

*Work advancing mechanism*

After the tool 124 has been angularly adjusted to provide the desired curve in the vertical meridian and the pivot post 37 has been positioned so that the desired curvature in the horizontal meridian will be generated, the article or blank 135 carried by the spindle 134 is inserted in the V-groove 133 of the chuck 129. When the spindle 134 is properly seated in the V-groove 133, the end of the contact member 144 will engage the end of a feed contact member 151 (Figs. 2, 10, and 11) which forms a part of the work feed mechanism 152.

The work feed mechanism 152 is mounted in a housing 153 which is attached as by bolts 154 to the upper end of a second housing 230 which is in turn mounted on the base 127 adjacent the outer end of the chuck 129. Axially aligned with the contact member 151 is a longitudinally extending feed rod 156. The feed rod 156 has one end extending outwardly through the end of the housing 153 and the end thereof nearest the feed contact member 151 carries a key 157 (Fig. 10) which is inserted in a keyway 158 formed in the inner surface of a threaded drive member 159 which is mounted over the end portion of the feed rod 156. The drive member 159 is threadedly located in a tubular support 160 which is positioned within an opening in the housing 153 and is locked in position therein by means such as set screws 161. The outer end of the drive member 159, adjacent the chuck 129, has the feed contact member 151 fixedly mounted therein. Thus, it will be apparent that as the feed rod 156 is rotated, consequent rotation of the drive member 159 will result, whereupon the drive member 159 will move longitudinally within the supporting member 160 and the contact member 151 will simultaneously be moved in a direction toward or away from the work-carrying spindle 134. A fiber collar 163 is positioned within the opening in the supporting member 160 adjacent the end thereof and limits the outward movement of the drive member 159. The opposed end of the feed rod 156 carries a sprocket 164 thereon which is spaced from the outer end wall 165 of the housing 153 by a washer 166. The sprocket 164 is so located on the rod 156 as to prevent longitudinal movement of the rod in a direction toward the chuck 129. Thus, it will be apparent that when the feed rod 156 is rotated, with consequent rotation of the drive member 159, the drive member 159 will be permitted to move longitudinally by means of the sliding engagement of the key 157 with the slot 158. A scale 167 is carried by a ring 167a which is located on the end of the supporting member 160 to indicate to an operator the number of rotations of the feed rod 156 and drive member 159.

The outer end of the feed rod 156 has attached thereto, as by a key 168, a hollow hub 169 which has an apertured retainer 170 secured as by screws 171 to the outer end thereof. The retainer 170 carries in the aperture thereof the threaded portion 172 of a knurled adjusting knob 173. The inner end of the threaded portion 172 of the knob 173 is adapted to engage the adjacent end of the feed rod 156 and is provided with a fixed collar 174 which is adapted to engage the inner surface of the retainer 170 to prevent displacement of the knob from its connected relation with the retainer 170. The adjacent end of the feed rod 156 is provided with a collar 175 against which a retaining ring 176 is urged as by a coil spring 177 mounted over the end of the rod 156 between the retaining ring 176 and inner surface of the end portion of the tubular member 169. Thus, it will be apparent that the spring 177 functions to urge the hub 169 and consequently the retainer 170 and knob 173 in a direction toward the chuck 129. In order to manually rotate the feed rod 156 and move the contact member 151 toward or away from the work-carrying spindle 134, it is necessary to turn the knob 173 sufficiently to cause the end of the threaded portion 172 thereof to engage the end of the feed rod 156. Further rotation of the knob 173 will cause the retainer 170 and hub 169 to be pulled outwardly of the recess in the sprocket 164 against the tension of the spring 177. The feed rod 156 can then be easily rotated independently of the sprocket 164 to adjust the contact member 151 as desired.

It is to be noted here that the outer end of the sprocket 164 is provided with a tapered recess shaped to receive the tapered end portion of the hub 169. This provides a frictional clutch between said sprocket and hub. This arrangement is provided so that the sprocket 164 can be rotated and, through the frictional engagement thereof with the hub 169, will consequently rotate the rod 156. Since the sprocket 164 is operatively connected with automatic feed mechanism to be described hereinafter, it is apparent that the engagement between the sprocket 164 and hub 169 must be broken in order to provide means for manually rotating the feed rod 156 by the knob 173.

To provide means for electrically rotating the feed rod 156, a motor 178 is mounted on a cover 180 secured to housing 153 and provided with a sprocket 179a which is operatively connected to the sprocket 164 by means such as a chain or belt 179. Thus, upon operation of the motor 178 and engagement of the tapered hub 169 with tapered recess in the sprocket 164, it will be apparent that rotation of the feed rod 156 will result. A cover plate 180a is preferably mounted on the cover 180 over the chain drive mechanism to prevent possible injury to an operator or damage to the operative parts of the device.

In accordance with this invention, the automatic mechanism includes means for intermittently advancing the work such as the lens blank 135 in a direction toward the abrading tool 124 for abrasion of a surface thereof to desired shape. This may be accomplished by the present device in not more than four successive steps. Mounted in encircling relation with the feed rod 156 within the housing 153 are cylinders or drums 181, 181a, 181b and 181c each bearing a respective circumferentially arranged millimeter scale 182, 182a, 182b and 182c. A front opening 183 (Fig. 11) is provided in the housing 153 and is adapted to be covered by a plate 184, the scales being visible to an operator through windows which are provided in the plane 184 and which carry indicators 207, 207a, 207b and 207c, see Fig. 2. Attached to each scale-bearing drum is a respective annular disc 185 (Fig. 10) to which are screwed or otherwise suitably attached respective worm wheels or gears 186. Worms 187 are carried by the inner ends of respective shafts 188 which are rotatably mounted in supporting brackets 189 secured by screws or the like to a plate 189a (Figs. 3 and 11) which is carried by the back wall of the housing 153. The worms 187 are retained in mesh with the respective worm gears 186. The outer ends of the shaft 188 extend through the removable front wall 190 of the housing 153 and carry knobs 191 thereon.

Thus, the scale-bearing drums 181—181c may be rotated about the feed rod 156 both independently of the feed rod 156 and of each other merely by manual operation of the respective knobs 191. Covers 192 are located over each of the worms 186 to protect them from contamination. Adjacent each of the scale-bearing drums 181—181c are positioned co-operating smaller drums 193, 193a, 193b and 193c respectively each of which are provided with hubs 194 (Figs. 10 and 11) fixedly secured to the feed rod 156 as by set screws 195. Fiber or rubber insulating sleeves 196 are mounted over the hubs 194. The small drums 193—193c extend partially within the larger respective scale-bearing drums 181—181c but are not connected thereto. Thus the small drums 193—193c are all simultaneously rotatable with the feed rod 156 independently of the scale-bearing drums 181—181c.

Each small drum 193—193c has a relatively flat member 197 (Fig. 11) fixedly secured to its inner wall, the member 197 carrying a tab or switch-operating contact member 198. Each scale-bearing drum 181—181c has a microswitch 199 therein, the operating arms 200 of which are adapted to be moved by the contact members 198 in the small drums 193—193c to cause operation of the switches 199. The switches 199 are mounted on supporting plates 201 which are attached to the inner side wall of the respective scale-bearing drums 181—181c as by grommets 202 and are pivotally adjustable about the axes of the grommets 202 by means of adjusting screws 203. The adjusting screws 203 are carried by lugs 204 secured to the inner walls of the respective scale-bearing drums and threadedly engage extensions 205 provided on the brackets 201. Openings 206 (Fig. 11) are provided through the housing 153, scale-bearing drums and small drums, which openings 206 are adapted to be substantially aligned when the device is at zero adjustment whereby an instrument such as a screwdriver may be inserted to engage the adjusting screws 203 and thus move the adjacent end of the respective brackets 201 and microswitches 199 toward or away from the contact members 198 and thus position the switch-operating arms 200 in desired spaced relation with the contact members 198.

The microswitches 199 are provided in the electrical circuits of the device as will be described hereinafter. However, the operation of the automatic feed device is substantially as follows:

With the scale-bearing drums 181—181c set at zero and the tapered hub 169 engaged within the tapered recess in the gear 164, and with the end of the manual knob 173 spaced from the adjacent end of the feed rod 156, the driving screw 159 will be so located as to position the contact member 151 carried thereby at the zero position on scale 167. To set up the device to advance the work toward the tool in four successive steps, the four scale-bearing drums 181—181c must first be individually adjusted in accordance with the amount of material or depth of the cut which is desired for each of the successive steps of the operation. For example, if it is desired to remove a total of four millimeters from the surface of the lens blank 135 or other article, the first drum 181 may be set so that the one millimeter indication on the scale 182 thereof will be aligned with the indicator 207 carried by the adjacent window in the cover plate 184. This will set up the device so that the abrading tool 124 will remove material from the surface of the lens blank 135 to a depth of one millimeter. The second drum 181a may be then adjusted by manual operation of the respective knob 191 so that the depth of the second cut will be set up. Assuming that a cut one millimeter in depth is to be made during the second step of the operation, the second scale 182a will be set to indicate one millimeter in addition to the setting of the first scale 181. The drums 181b and 181c are also adjusted in accordance with the amount of material to be removed during the third and fourth steps of the operation, that is, scale 182b will be set to indicate the depth of cut to be made during the third step of the operation plus the total depths of the first and second cuts, and scale 182c will be set to indicate the total amounts removed in the first, second and third steps plus the amount to be removed in the fourth step. It is to be understood here that since the microswitches 199 are attached directly to and movable with the scale-bearing drums 181—181c, that the adjustment of the drums will consequently move the microswitches 199 away from the respective contact members 198. Then upon operation of the motor 178, through an electrical circuit to be described fully hereinafter, the chain 179 will cause rotation of gear 164 and consequently of the feed rod 156. Rotation of the feed rod 156 will cause simultaneous rotation of the small drums 193—193c. When the rod 156 has rotated the small drum 193 sufficiently to cause the contact member 198 thereof to engage the operating arm 200 of the microswitch 199 mounted in the respective scale-bearing drum 181, operation of the motor 178 will be temporarily discontinued and the tool will be allowed to abrade the surface of the lens blank 135 to a depth in accordance with the adjustment of the scale 182. It will be pointed out here that as the feed rod 156 and drum 193 are being rotated the driving screw 159 is simultaneously being moved slowly in a direction toward the spindle 134 and the feed contact member 151 will cause longitudinal movement of the spindle 134 and lens blank 135 toward the tool. After the first cut has been made the electrical circuits will automatically function to again start the motor 178 which will cause rotation of the feed rod 156 and small drums 193—193c to the point where the contact member 198 carried by the second drum 193a will cause operation of the respective microswitch 199 in the second scale-bearing drum 182a, whereupon feeding of the work will again be stopped. This procedure is repeated four times in the present example.

It will be pointed out here that each of the microswitches 199 in the scale-bearing drums 181—181a and 181b are connected to respective toggle switches 208, 208a and 208b (Fig. 2), and by operation of the toggle switches any one of the first three steps of the operation may be eliminated. This again will be more clearly described in the description of the electrical circuit hereinafter given. However, the fourth step which is initiated by the adjustment of the fourth scale 182c will always be made.

Figure 10:
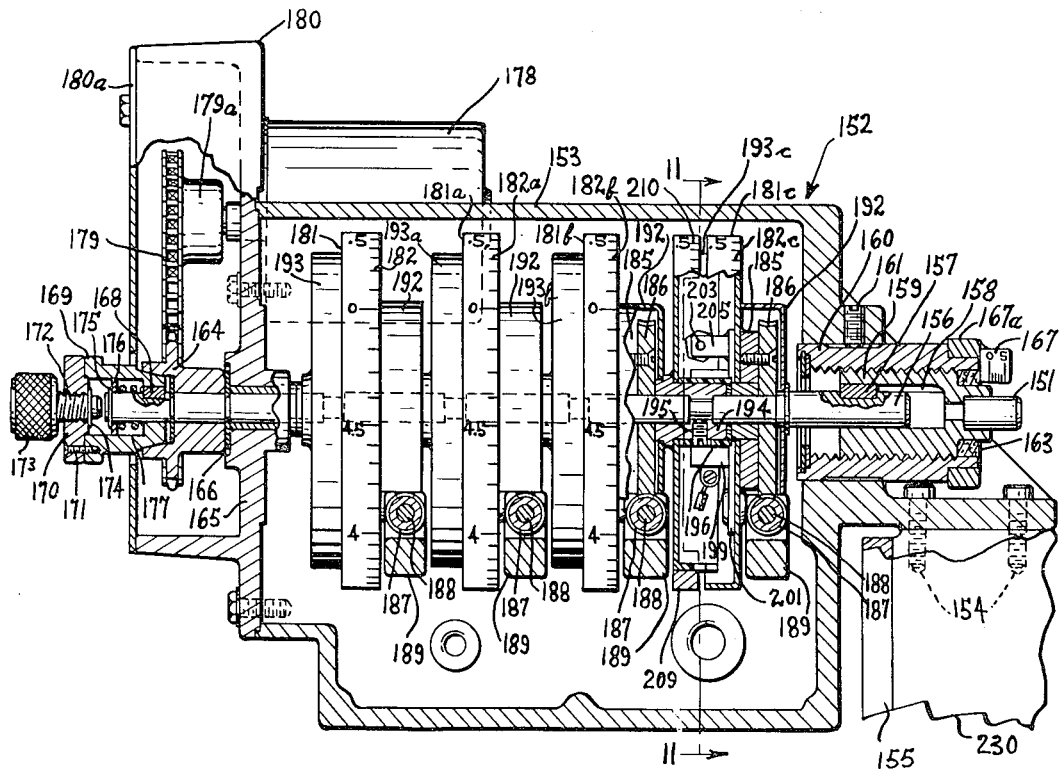
Fig. 10 is an enlarged vertical sectional view through the control mechanism for advancing the work.
Figure 11:
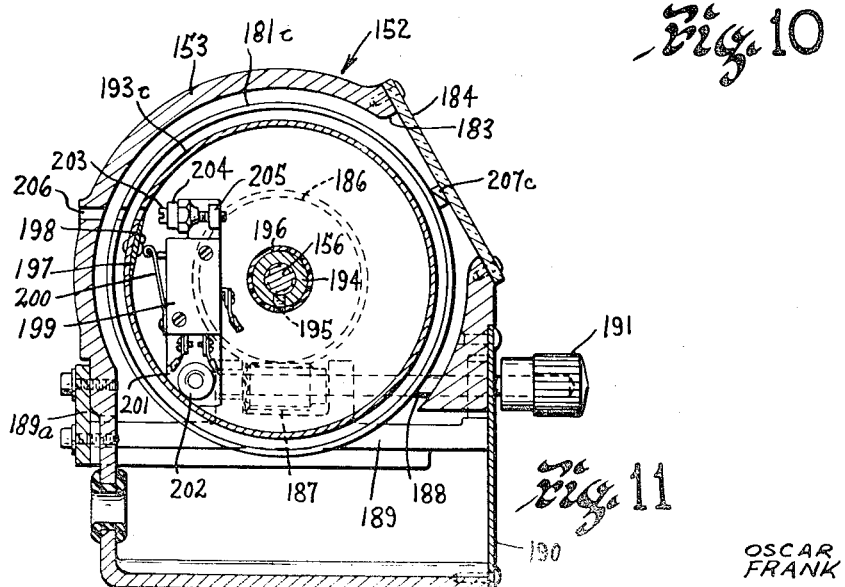
Fig. 11 is a vertical sectional view taken substantially on line 11—11 of Fig. 10 looking in the direction of the arrows.

So that an operator may know at any time the entire extent of the depth of the cuts or removal of the material, or the position of the blank, at any point during the entire abrading operation, one of the small drums, preferably drum 193c has mounted thereon an annular ring 209 which is provided on the periphery thereof with a circumferential scale 210 (Fig. 10). Since the small drums 193—193c all move simultaneously when the feed rod 156 is rotated, the ring 209 will thus also be moved.

It will be noted that if necessary as many as four or more steps may be taken to abrade an article to the desired size and shape if necessary since the feed contact member 151 may be moved as much as ten millimeters longitudinally and thus can be used to remove a total depth of ten millimeters if desired. However, after the first four steps have been completed as described above it will be necessary to readjust the scales 182—182c for performing subsequent abrading steps. If desired a predetermined amount of the material may be removed from the article by feeding the article into the tool first by manual operation of the feeding device as described above and subsequently performing the successive final steps by the automatic operation. The machine is so connected in the electrical circuit that upon completion of the four abrading steps, or more specifically the completion of the final abrading step controlled by rotation of drum 193c, the machine will be entirely shut off.

Tool feeding mechanism

After each feeding of the work toward the tool by the feeding mechanism 152 described above, the tool will be caused to sweep across the work by swinging about the axis by the pivot post 37. This may be done manually by first moving the tool head 24 to one side where the tool is not in engagement with the work and then allowing a weight or force attached to the head to swing the head in the opposite direction to cause the tool to traverse the article being abraded.

Figure 14:
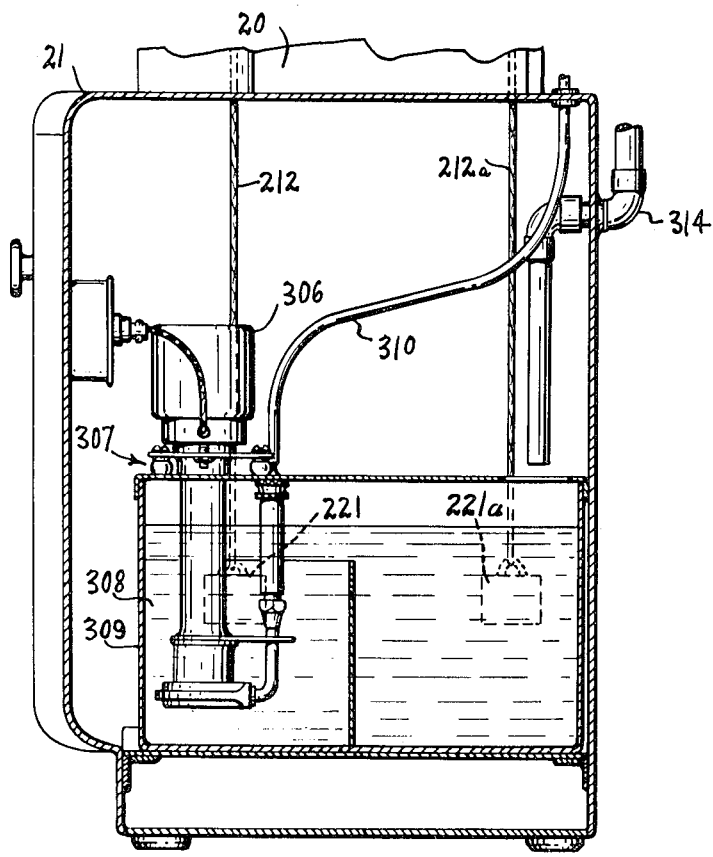
Fig. 14 is a fragmentary vertical sectional view taken substantially on line 14—14 of Fig. 1 looking in the direction indicated by the arrows.

However, in accordance with the present invention, the head is adapted to automatically swing in both directions to allow the tool to abrade the article each time it passes through the arc of its swing. To accomplish this the end of the base member 64 is provided with an arcuate rim portion 211 (Fig. 9) to the opposed sides of which are connected as by screws 213 one end of a pair of drive cables 212 and 212a. The other ends of the cables 212 and 212a are extended over spaced horizontally disposed pulleys 214 and 214a which are rotatably mounted on respective pivot pins 215 and 215a carried by an inwardly extending shelf or top portion 216 of the base 127 (Figs. 2 and 9). From the respective screws 213 the cables pass over the arcuate end of the rim portion 211, crossing one another, and then pass over said pulleys 214—214a to respective vertically disposed drums or spools 217 and 217a around which they are wound. The spools 217—217a are freely rotatably mounted near the opposed ends of a transversely extending shaft 218 on respective sleeves 340 (Fig. 15) through which the shaft 218 extends. The shaft 218 is slidably and rotatably mounted in spaced vertically extending web portions 219 of the base 127 (Fig. 2). Bosses 220 (Fig. 9) are formed integral with the web portions 219 and carry locking screws 341 for retaining the sleeves 340 in place. The outer ends of the sleeves carry collars 342 which engage recessed end surfaces of the respective spools to prevent displacement of the spools. The cables 212 and 212a pass downwardly from the spools 217—217a through the base 127 into the cabinet 21, as shown best in Fig. 14, and have weights 221 and 221a connected to their respective ends. The weights are for the purpose of keeping the cables taut and in desired relatively intimate engagement with the spools 217—217a and to thereby cushion the sweeping movement of the head. This latter feature of using weights is believed to be of relative importance since the spools 217—217a are thus preloaded. However, since the cables are not attached directly to the spools, the arrangement functions as a safety device by allowing the spools 217—217a to turn freely within the coils of the cables in the event that some circumstance occurs to prevent or retard the swinging movement of the tool-supporting head while the clutch driving mechanism is functioning.

The outer sides of the spools 217—217a are provided with toothed portions 222 and 222a which are adapted to engage the teeth of respective toothed clutches 223 and 223a which are fixedly mounted on each end of the shaft 218 outwardly of the spools 217—217a. The shaft 218 is slidable in the supporting bosses 220 and thus one or the other of the two clutches 223—223a may be selectively engaged. For example, with clutch 223a engaged and clutch 223 disengaged, as illustrated in Fig. 9, the shaft 218 may be rotated to wind cable 212a on spool 217a, while the spool 217 would be allowed to freely rotate on the shaft 218 to permit unwinding of the cable 212 therefrom. However, it is apparent that if the shaft 218 was in such a position that clutch 223 was engaged and clutch 223a disengaged, cable 212 would be wound on spool 217 while spool 217a would freely rotate on the shaft 218 to allow cable 212a to be unwound.

It is apparent that if one or the other of the cables 212 or 212a is thus caused to be wound on its respective spool 217—217a, this will cause the base member 64 to swing accordingly about the axis of the pivot post 37 together with all of the parts of the machine mounted thereon. Thus, the tool 124 is caused to swing across the lens blank 135 as illustrated in Fig. 13 to abrade the blank to the depth previously selected by the work feeding device 152. Then after the swing is completed and the feed device 152 again operated, the shaft 218 may be moved to cause engagement of the second clutch 223—223a thus swinging the base member 64 and consequently the tool 124 in the opposite direction to perform a second abrading operation on the lens blank 135. This procedure may be repeated for a total of as many as four swings of the tool in a machine constructed as described herein, thus allowing four automatic abrading steps to reduce the surface being abraded to the desired depth.

The toothed portions 222 and 222a may be moved and held in a neutral position whereby they will not engage either of the clutch member 223 or 223a if desired.

The means for rotating the shaft 218 to automatically swing the tool-supporting head in the manner described comprises a motor 224 (Figs. 2 and 3) which is secured as by a suitable bracket 225 and supporting plate 226 to the bottom of the base 230 near the outer end thereof. A drive chain 227 (Fig. 2) connects the motor 224 to sprocket 228 on one end of a shaft 229 which is mounted on the adjacent end wall of the housing 230. On the shaft 229 adjacent the inner side of said wall of the housing 230 is a screw 231 which is constantly in mesh with and drives a gear 232. The gear 232 is fixedly mounted adjacent one end of a transversely extending shaft 233. The other end of the shaft 233 carries a sprocket 234 (Figs. 3 and 6) which is connected, through a chain drive 235, to a sprocket 236 fixed to the rear end of the clutch shaft 218. Thus, operation of the motor 224 will rotate clutch shaft 218 through chain 227, sprocket 228, screw 231, gear 232, shaft 233, sprocket 234, chain 235 and sprocket 236.

It is particularly pointed out that an important contribution to this invention is the provision of means for maintaining relatively constant rate of feed of the tool, and consequently the pressure upon the tool as it swings during an abrading cycle. Such control is provided by forming the arcuate rim 211 of the base member 64 to a controlled contour shape. It is understood that tools such as the diamond charged type become inefficient when the depth of cut during abrading is extremely thin or when the tool is rotated at relatively slow speeds. With such conditions the cutting edges of the diamonds or other abrading particles become dulled. It has also been found, however, that an excessive rate of feed of the tool through an article, such as by "crowding" the tool, results many times in breakage of the work. It is apparent that as the tool swings about the axis of pivot post 37 the entire base member 64 will pivot about the post 37. Since the axis of post 37 is located at different distances from the tool in accordance with the radius of curvature to be formed in the horizontal meridian it is impossible to provide the rim portion 211 with a single true radius throughout which will have its center always on the axis of post 37. Therefore, the rim portion 211 has been provided with a predetermined curvature whereby as the machine goes through an abrading cycle the tool will be fed at a substantially constant rate which, in the present machine, is established at less than the optimum so that breakage is reduced and yet fast enough to provide efficient results from an abrading tool. With such an arrangement a constant unit pressure is applied to the tool regardless of the size of the area of the tool which happens to be in engagement with the work. It has been found that the best performance results when the rim portion 211 is elliptical, the central profile being formed relatively flat while the end portions thereof nearer the connecting screws 213 are each provided with a curvature in profile having a relatively short radius. With such an arrangement the cables 212 and 212a will selectively apply a pulling force on the head at an angle approaching the normal to the longitudinal axis of the head and will, throughout the sweep of the tool across the work, be maintained substantially constant in their angular relation to one another and their point of crossing will also remain substantially unchanged. Thus, since the angle of pull upon the head is substantially constant and the resultant tension upon the tool is also substantially constant, it is apparent that the tool will be normally fed through the work such as a meniscus-shaped lens blank at a substantially constant speed, throughout the length of the sweep, regardless of the curvature being generated. Such substantially constant speed will be maintained unless there is encountered a hard spot in the lens blank on a barrier to the swinging movement of the head, whereupon the particular cable 212 or 212a doing the driving at the time will slip upon its respective spool 217 or 217a and thus prevent breakage of the work or of the machine.

*Chuck control means*

Figure 5:
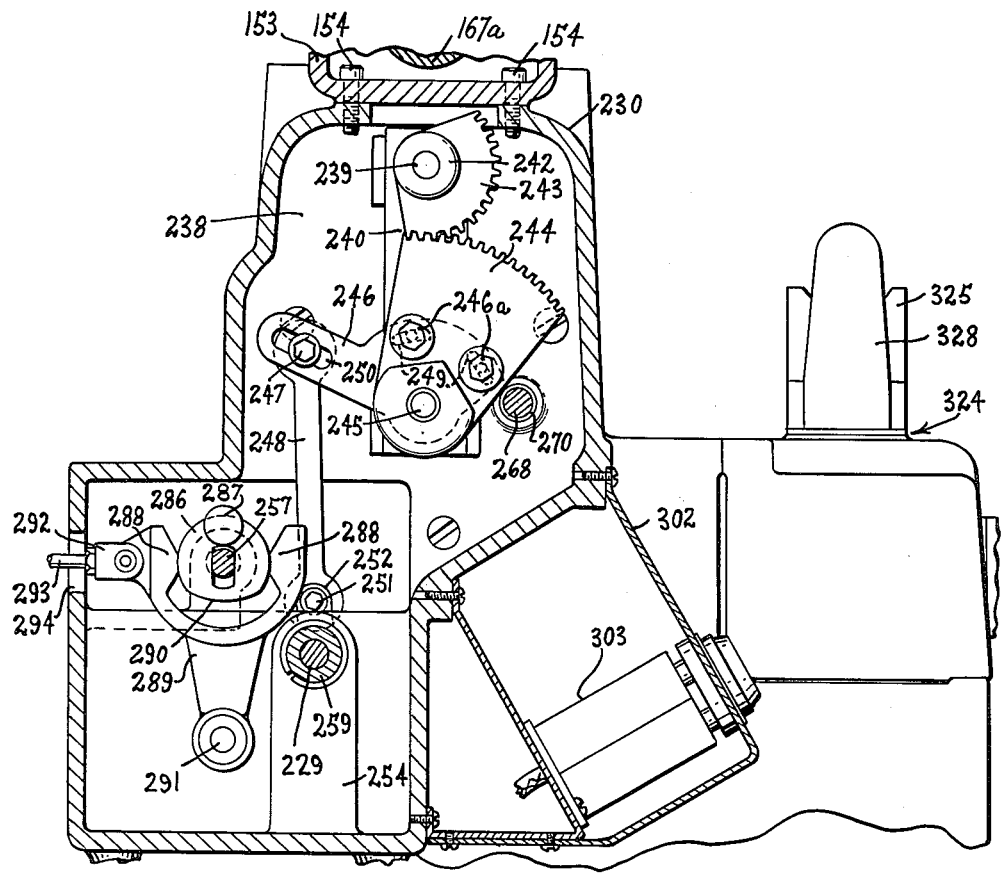
Fig. 5 is a vertical sectional view taken substantially on line 5—5 of Fig. 2 looking in the direction indicated by the arrows.

It will be apparent that the chuck 129, being of the permanent magnet type, must be conditioned to on position during the abrading operation so that the magnetic field thereof will attract the work-carrying spindle 134 and fixedly retain it in the V-groove 133. At the completion of the abrading operation the chuck is conditioned to off position whereupon the holding effect of the magnet is released and the work feeding mechanism 152 may be operated to slide the spindle longitudinally within the V-groove 133 in a direction toward the tool. The chuck 129 is provided with an operating shaft 237 (Fig. 2) to turn the chuck on and off. The shaft 237 carries a collar 237a which is held thereon by a set screw or the like. The collar has a portion extending through the adjacent wall 238 of housing 230 and is coupled to one side of a tongued floating member 239. To the other side of the floating member 239 is coupled one end of a shaft 239a (Figs. 2 and 5) which is rotatably mounted on a plate or bracket 240 vertically adjustably secured to the wall 238 as by a screw 241. The inner side of the bracket 240 carries a boss or bushing 240a on its opposed surface to aid in properly supporting the shaft 239a. The outer end of the shaft 239a has pinned thereto a hub 242 which carries a gear segment 243 thereon. The gear segment 243 is constantly in mesh with a second gear segment 244 which is rotatably mounted as by a stud 245 on the bracket 240. To the gear segment 244 is connected, as by bolts 246a, a bell crank 246 which is pivoted on the stud 245 and has a portion which is connected as by a pivot 247 to the upper end of a link 248. The bolts 246a carried by the bell crank 246 extend through slotted openings 249 in the segment 244 and thus the segment 244 can be angularly adjusted with respect to the bell crank 246. The pivot stud 247 is adapted to extend through a slot 250 in the bell crank 246 and thus upon movement of the link 248, the bell crank 246 may be moved to cause the gear segment 244 to swing about pivot 245. It is apparent that movement of the gear segment 244 will cause consequent movement of gear segment 243 which, being fixed to shaft 239, will consequently cause rotation of chuck operating shaft 237. The lower end of link 248 is rotatably attached as by a pivot stud 251 to a crank 252 which is rotatably mounted on the adjacent end of the shaft 229. The crank 252 is journaled in an upwardly extending portion 254 of the inner wall of the housing 230. The opposed end of the crank 252 is coupled by suitable means such as a tongue and groove arrangement with one end of a gear 259 which is fixedly secured to the free end of an over-running clutch 256. The opposed end of over-running clutch 256 is secured to the shaft 229 and thus is adapted to be rotated by motor 224. One half turn of the shaft 229 and crank 252 is sufficient to turn the chuck on or off.

In the operation of the device, when motor 224 is operated in a clockwise direction the shaft 229 will be rotated thereby and consequently will cause the clutch 256 to engage and through gear 259, crank 252 and link 248 will cause the bell crank 246 to be rotated about pivot 245, consequently causing rotary movement of the gear segments 244, 243 and shafts 239—237 to turn on the magnetic chuck 129. Immediately after the chuck has been turned on the motor 224 is caused to reverse. This will cause counter-clockwise rotation of the shaft 229 and screw 231 which will, through the mechanism described hereinbefore, cause the tool 124 to be swung in one direction in accordance with the particular clutch 223 or 223a which is engaged. Such reversal of the direction of rotation of the shaft 229 will not turn off the chuck 129, however, because the over-running clutch 256 which operates the crank 252 becomes disengaged except when the shaft 229 is rotating in the first-mentioned clockwise direction. The chuck remains in on magnetized condition until the motor 224 again operates in clockwise direction and causes the crank 252 to be again rotated one half turn.

*Electrical control means*

Figure 3:
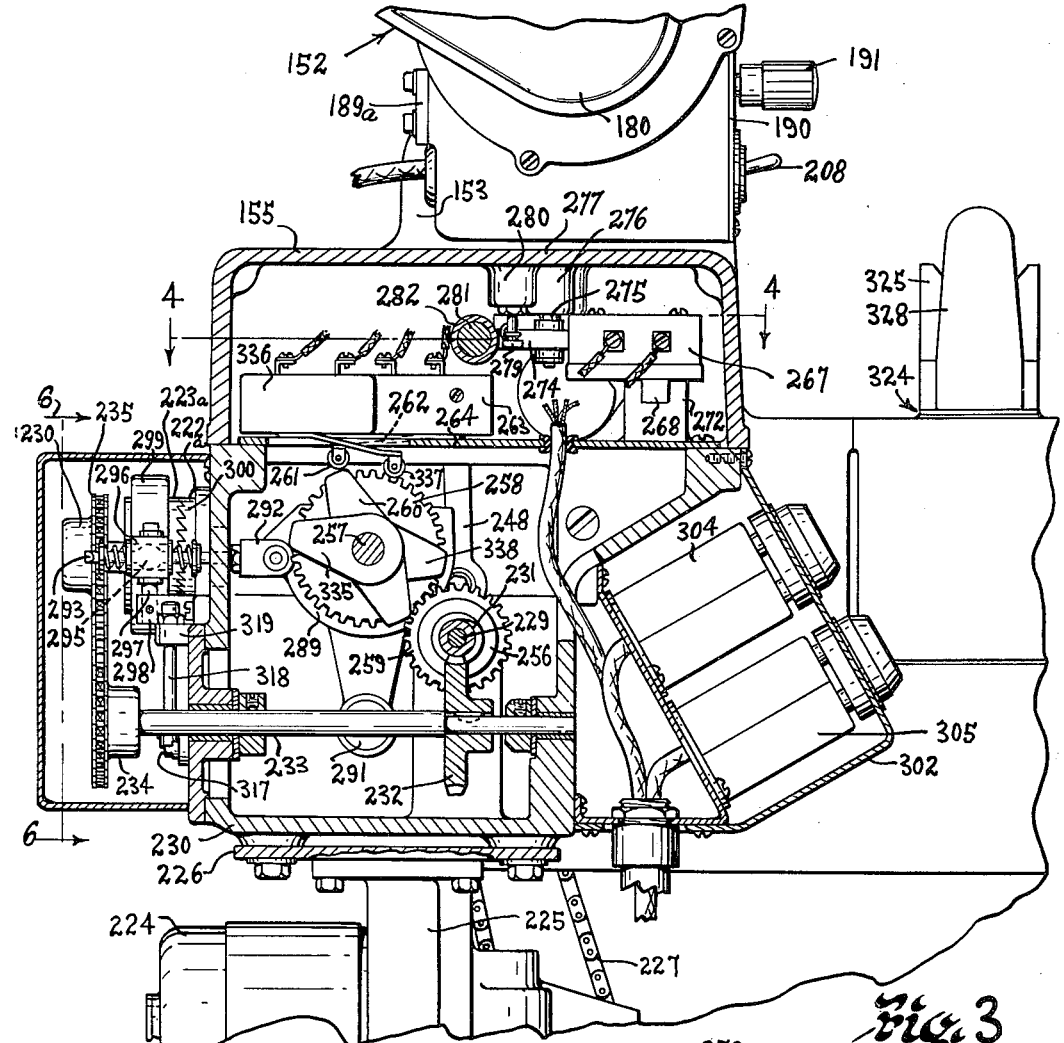
Fig. 3 is a vertical sectional view taken substantially on line 3—3 of Fig. 2 looking in the direction indicated by the arrows.

The mechanical means for causing operation of electrical means to control the motor 224 comprises a shaft 257 which is channelled in the upper end wall 254a of housing 230 above the shaft 229 (Figs. 2 and 3). The shaft 257 is rotated by means of a gear 258 which is fixed thereon and which is in mesh with the gear 259 on shaft 229. The shaft 257 also has a cam 260 which is rotatable therewith. When the chuck 129 has been turned on, the cam 260 will engage a roller 261 carried by the operating arm 262 of a microswitch 263 (Figs.

2 and 3) which is mounted on a shelf 264 attached to the wall of the housing 230. The microswitch 263 functions in the electrical circuit to cause the motor 224 to run in a counter-clockwise direction whereupon the tool 124 will be made to sweep across the lens blank 135 as described.

The outer end of the shaft 257 extends out through the housing 230 and through a protective guard or cover 265 which is mounted over the chain drive 227, the shaft 257 carrying a knob 266 on its opposed end whereby the chuck-control mechanism may be operated manually if desired.

To continue the sequence, when the tool 124 swings in its arc to a point where it has passed out of engagement with the lens blank 135, a limit switch 267 (Figs. 2, 3 and 4) is operated to cause the motor 224 to again run in a clockwise direction. The limit switch 267 is carried by one end of a slide rod 268 which extends from beneath the work-feeding mechanism 152 longitudinally of the machine to a point adjacent the end of the quadrant-shaped plate 73.

Figure 4:
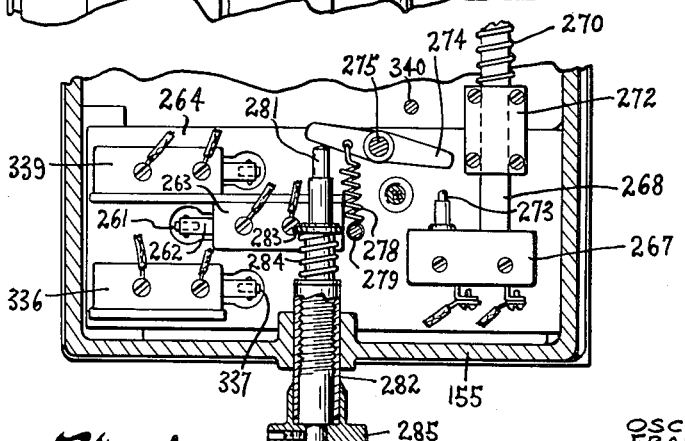
Fig. 4 is a horizontal sectional view taken substantially on line 4—4 of Fig. 3 looking in the direction indicated by the arrows.

The end of the slide rod 268 nearest the plate 73 carries a roller 269 thereon (Figs. 2 and 9) which is rotatable about a vertical axis and is maintained in engagement with the edge of the switch control plate 79 by means of coiled springs 270 (Figs. 2 and 4). The springs 270 are positioned between collars or other retaining means 271 carried by the slide rod 268 and the ends of slideways 272 which are carried by portions of the base 127 and shelf 264 and in which the rod 268 is slidable. Thus, the rod 268 is constantly urged by the springs 270 in a direction toward the control plate 79 whereby the roller 269 will be maintained constantly in engagement therewith.

Since the microswitch 267 is fixed to and movable with the slide rod 268, it is apparent that movement of the slide rod, through action of springs 270, in a direction toward the control plate 79 will consequently cause movement in a similar direction of the switch 267. The curvature of the edge of the control plate 79 is predetermined so that when the tool-supporting head 24 is swung, the roller 269 will ride along the edge of the plate 79, and since the axis of the pivot post 37 is located in offset relation with the vertical axis of the point of engagement of the roller 269 with the plate 79, it is obvious that the slide rod 268 will gradually move in a direction toward the tool-supporting head 24. When the head has been swung to one side sufficiently for the tool 124 to be moved out of engagement with the lens blank 135 the slide rod 268 will have moved along sufficiently for the operating button 273 thereof to engage and be actuated by a stop member 274 (Figs. 2 and 4). The stop member 274 consists of an arm which is connected by a pivot 275 to a boss 276 formed on the under side of the top portion 277 of the cover 155. A coil spring 278 is attached at one end to the end of the stop member 274 opposed to the end thereof which is adapted to be engaged by the switch operating button 273. The coil spring 278 has its opposed end secured to a stud 279 which is located in a boss 280 formed on the top 277 and functions to urge the adjacent end of the stop member 274 against the inner end of an adjustable stud 281 which is threadedly mounted in a bushing 282 carried by the upper portion of the end wall of the cover 155. A collar 283 is mounted on the stud 281 in spaced relation with the inner end of the bushing 282, and a coil spring 284 is mounted thereon between the collar 283 and bushing 282 to take up any play in the threads. It is apparent that by manual rotation of a knob 285 which is attached to the outer end of the stud 281, the stud may be adjusted inwardly or outwardly within the bushing 282 in the manner of a micrometer and thus control the spacing between the end of the pivoted stop member 274 and the operating arm 273 of the microswitch 267 in accordance with a scale 281a which is provided on the outer portion of the bushing 282. The scale 281a is calibrated in accordance with various lens diameters and thus by merely adjusting the stop member 274 the operator of the device can be assured that the microswitch 267 will operate immediately after the abrading tool has passed out of engagement with a lens blank during an abrading cycle, the switch 267 then functioning to stop further swinging movement of the tool-supporting head. A stop pin 340 carried by a fixed portion of the housing limits the extent of movement of the stop member 274 when the stud 281 is removed.

Microswitch 267 is so connected in the electrical circuit that when actuated it will cause the motor 224 to again run in a clockwise direction. This will then cause the chuck control crank 252 to again rotate one half turn which will place the chuck in off condition. As this is taking place the clutch 223 or 223a is caused to become disengaged and the spools 217—217a will then be free to rotate. To accomplish this, the shaft 257 carries thereon a disk-like member 286 (Figs. 2 and 5) which is provided with a riser 287. The disk 286 and riser 287 are shown in neutral positions in Fig. 5. However, when the shaft 257 is caused to rotate the disk 286 will rotate therewith, whereupon the riser 287 will engage one or the other of the inner surfaces 288 of a cam yoke 289. Since the side of the disk 286 opposed to the side carrying the riser 287 is reduced as indicated at 290 in Fig. 5, engagement of riser 287 with one of the surfaces 288 will cause the cam yoke 289 to be moved accordingly. The cam yoke 289 is pivoted as at 291 to the wall of housing 230 and has a clevis 292 pivoted to the outer side thereof.

Figure 6:
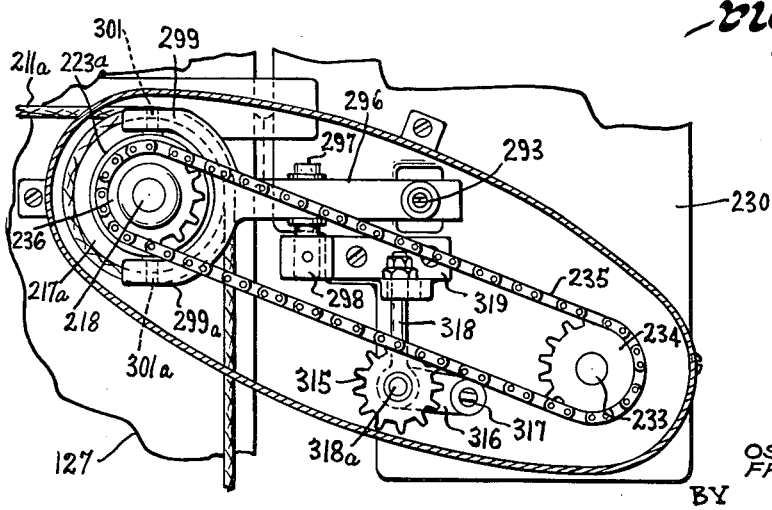
Fig. 6 is a vertical sectional view taken substantially on line 6—6 of Fig. 3 looking in the direction indicated by the arrows.

To the clevis 292 is connected one end of a rod 293 which extends rearwardly and outwardly of the housing through an opening 294. The rod 293 is provided with a ball-like portion 295 (Fig. 3) which is connected for universal motion with one end of a clutch shifting yoke 296 (Figs. 6 and 9). The yoke 296 is pivotally mounted for transverse swinging movement on a pivot stud 297 which is carried by a bracket 298 attached to the adjacent wall of the housing. The opposed end of the yoke 296 is bifurcated and the curved arm portions 299—299a thereof extend above and below the clutch 223a, the clutch 223a being provided with a peripheral groove 300 (Figs. 3 and 9) for receiving the end of pins 301—301a in the respective arm portions 299—299a.

Thus, when the cam yoke 289 is moved by the riser 287 on the shifting cam or disc 286, the movement thereof is transmitted through clevis 292, rod 293 and yoke 296 and through the clutch 223a, to shaft 218. In this manner the device can be shifted to cause engagement of one or the other of the clutches 223—223a or to place them in a neutral position wherein they will rotate but will still be out of engagement with the spools 217—217a.

After the microswitch 267 causes clockwise rotation of the motor 224, the shaft 257 will rotate sufficiently to place the riser 287 intermediate the surfaces 288 on the cam yoke 289. The sides of the disc 286, which engage the surfaces 288, will then operate the clutch shifting mechanism to place the clutches 223—223a in neutral. As this takes place the shaft 257 rotates one half turn and thus causes the crank 252 to rotate, and through link 248 and gear segments 244 and 243 to turn the chuck 129 off as described above.

As the clutch mechanism becomes neutral, a cam 335 on shaft 257 operates microswitch 336 by engagement with a roller 337 carried by the switch operating arm, and the switch 336 then functions to stop motor 224 and to start the motor 178 which operates the work-feeding mechanism 152 to advance the lens blank 135 a predetermined distance in accordance with the setting on the second scale 182a. It is pointed out here that a third cam 338 is also mounted on shaft 257 and is adapted to operate a third microswitch 339 as will be described in connection with the electrical circuit for stopping motor 224 and starting motor 178 when the tool-supporting head is positioned at the opposed end of its path of movement.

Then the cycle is repeated until the final swing of the tool is made to remove material from the lens blank to a depth as controlled by the setting of the fourth scale 182c.

On the front of the housing below the toggle switch panel 190 is a switch box 302 (Figs. 1, 3 and 5) which contains a push button 303 which operates to place the micrometer feed in the automatic cycle and a pair of push buttons 304 and 305 for controlling the starting and stopping of the automatic feed control.

Below the switch box 302 is another box 320 which contains a main "start" push button 321 and a main "stop" push button 322, with a pilot light 323 being located therebetween. The main "start" push button 321 controls the flow of electrical power to the automatic feed control circuit, to the motor 108 which rotates the tool 124, and also to a motor 306 (Fig. 14) which operates a pumping device 307 to force a coolant 308 from a tank 309, located in the cabinet 21, outwardly through a main line 310 to lateral lines 311 and 311a (Fig. 7) which direct the coolant onto the engaging surfaces of the tool 124 and lens blank 135. A housing 312 having a movable cover 313 is mounted around the tool and work areas to confine the coolant during an abrading operation. The coolant is returned from the housing 312 to the tank 309 by a pipe 314.

Another switch 343 is carried by the supporting plate 25 (Fig. 7) and has an operating arm 344 carrying a roller 345 which is adapted to be engaged by a cam 346 on the periphery of the base plate 38 when the tool-supporting head 24 is located to one side of center. The roller 345 is adapted to be out of engagement with the cam 346 when the head is located on the opposite side of the center. Switch 343 is for the purpose of placing the electrical circuit of the machine in proper operating condition regardless of whether the tool-supporting head 24 is located at one side or the other of center when an abrading cycle is about to be started.

Means is also provided for taking up slack in the chain drive 235 which rotates the clutch devices and thus causes the tool to sweep across the work. This means comprises a pressure sprocket 315 (Fig. 6) which engages the under side of the chain drive 235 and is mounted on the end of an arm 316 which is pivoted at 317 to the adjacent wall of the housing. A vertically extending stud 318 is pivotally connected at one end to the arm 316 by a pivot 318a and is longitudinally adjustable in a portion 319 of bracket 298 which is attached to the adjacent wall of housing 230. By adjusting the stud 318 up or down in the bracket 319 the arm 316 and sprocket 315 may be moved toward or away from the chain drive 235 to adjust the tension thereon.

Means is also provided in the present invention for properly locating a lens blank 35 on a spindle 134 so that when the spindle 134 is initially positioned in a chuck 129 the blank 35 will be in a known predetermined relation with the abrading surface of the tool 124. For this purpose there is provided a jig 324 which is mounted in a convenient location on the front of the machine and which comprises a base having four uprights thereon. The two inner uprights 325 have V-grooves for receiving the spindle 134; one of the outer uprights 326 has an adjustable pin 327 against which the lens blank 135 is adapted to be positioned; and the other outer upright 328 functions as a stop against which the slidable contact member 144 is adapted to be positioned. The distance between the end of the contact member 144 and the adjustable pin 327 should correspond to the predetermined distance between the feed contact member 151, when the micrometer feed device is at zero, and the nearest point of the arc of swing of the abrading surface of the tool 124. Therefore, by adjusting the pin 327 this distance can be controlled. After the pin 327 has been adjusted the spindle 134 carrying the lens blank 135 is placed in the V-grooves of the uprights 325 with the exposed surface of lens blank in engagement with the inner end of the pin 327. With the spindle in this position and with clamp arm 150 released, the spring 147 will tend to urge the contact member 144 outwardly of the spindle 134 in a direction toward upright 328 and into engagement therewith. Tightening of clamp arm 150 will lock the contact member 144 in this position and the spindle may then be placed in the chuck 129 with assurance that the lens blank is properly located with respect to the tool.

An additional feature of the present invention is a locking device for restraining the head mechanism 24 from undesired movement on the bed 22 of base 20. The locking device comprises a rotatable shaft 329 which is journaled in the bed 22 and carries an operating handle 330 on its outer end. The shaft 329 has a cam surface 331 thereon which is engaged by a locking pin 332 vertically slidable in a bushing 333. The pin 332 is adapted to be moved upwardly, when the shaft 329 is rotated, by the cam surface 331 and into pressing engagement with a gib 334 forming a part of the track 26. Thus, by operating the handle 330 to release the pin 332 the head mechanism 24 can be adjusted on the bed 22 and then the handle 330 can be operated to move the pin 332 upwardly into engagement with the gib 334 to prevent further movement of the head mechanism.

*Fully automatic cycle*

In describing a complete automatic cycle of operation, it will be assumed that the tool-supporting head mechanism 24 has been initially adjusted on the base 20 so that the pivot post 37 is properly located to position the tool 124 so that the tool will be swung in an arc in accordance with the curvature to be provided in the horizontal meridian of the lens blank 135, and that the tool itself is angled with respect to the pivot stud 74 in accordance with the curvature to be generated in the vertical meridian of the lens blank. The work-supporting spindle 134 is positioned in the V-groove 133 of the chuck 129, the chuck being de-energized, with the contact member 144 abutting contact member 151 of the micrometer feed device 152. The micrometer feed device 152 is adjusted so that the readings on scales 182, 182a, 182b, 182c, and 210 all register zero. The toggle switches 208, 208a, and 208b are in off positions. The entire electrical circuit is de-energized, and the tool-supporting head 24 is swung so that the tool 125 is positioned at one side of the machine ready to start a transverse swinging movement across the article to be abraded. The clutches 223 and 223a are in neutral or disengaged relation with respect to the spools 217 and 217a.

The operator, to complete setting up the machine to produce successive cutting operations, will initially adjust the micrometer scales 182—182c to provide the depth of cut desired for each cutting cycle. Then the operator will move toggle switches 208—208b in accordance with the particular cycles he wishes to complete, that is, he will leave any one or more of the toggle switches off if he wishes to eliminate that particular cutting cycle. Assuming that the operator wishes to remove a total amount of 4 millimeters of material from the surface of the lens blank 135 by employing four successive cutting cycles wherein each cycle will result in removal of 1 millimeter of material, he will set up scale 182 to register 1 millimeter, scale 182a to register 2 millimeters, scale 182b to register 3 millimeters and scale 182c to register 4 millimeters.

The machine now being set up for a cutting cycle, the operator will press the push button 321 which will energize the main circuit of the device. This is accomplished by energizing relay R1 through circuit *a*—R1— b—321—c—322—d—e. Energization of relay R1 will cause immediate closing of contacts S1, S2, and S3. This energizes the tool rotating motor 108 and coolant motor 306, which are in parallel, through circuit e—S2—f—motors 108 and 306—g—h—S3—j—a. Motors 108 and 306 will continue to operate until the end of the abrading operation or the main stop push button 322 is operated.

The circuit to the micrometer feed and chuck control circuits are energized by manual operation of push button 305. This causes energizing of relay R2 through circuit e—S2—f—k—304—m—305—n—2—R2—R—s—h—S3—j—a. Relay R2 causes closing of contacts S4. At this point the micrometer feed motor 178 starts to operate the feed rod 156 and consequently move contact member 151 in a direction toward the work carrying spindle 134. It is pointed out here that at this time the limit switch 267 on the end of the slide rod 268 is closed. This will cause the motor 178 to be energized through relays R3, R4, and R5. Closing of switch 267 causes energization of relay R3 through circuit t—u—267—v—R3—w—x—s—h—S3—j—a. Energization of relay R3 closes contacts S5 and S6. This energizes relay R4 through circuit t — y — S6—z—a1—S7—b1—c1—R4—d1—s—h—S3—j—a. Energizing relay R4 closes contacts S8, S9, and S10. It will be seen that upon closing of contact S8, relay R5 will be energized through circuit t — y — S6 — z — a1—S7—b1—S8—R5—e1—s—h—S3—j—a. The motor 178 thus is energized through circuit t—y—S6—z—263 (which is closed) —f1—S11—g1 — S12 — h1 — 178—j1—S20—k1—s—h—S3—j—a. Since the contact member 144 of the spindle 134 engages contact member 151 the movement thereof will cause longitudinal movement within the V-groove 133 of the work carrying spindle 134. When the feed rod 156 has rotated sufficiently to move the scale 182 from zero to the 1 millimeter indication, the normally closed microswitch 199 carried by the drum 193 will be opened. The closing of microswitch 263 also energizes relay R7 through circuit t — y—S6—z—263—m1—R7—n1—x—s—h—S3—j—a. Energizing of relay R7 to operate switches S7 and S17 breaks the circuit to R4 and returns contacts S8, S9, and S10 to their initial positions. Relay R5 meanwhile is held open through circuit t—y—S6—z—p1—microswitches 199, 199a, 199b, 199c—q1—R5—e1—s—h—S3—j—a.

Opening of microswitch 199 as described above thus breaks the circuit to relays R5 and R6. This does not, however, affect operation of motor 178 which continues to rotate the drum 193 sufficiently to permit the operating arm 200 of microswitch 199 to pass over the contact member 198 which will allow switch 199 to again close. When this happens relay R5 is again energized as described hereinbefore and the motor 178 is then dynamically braked by shorting out the capacitor C1 thereof through circuit h1—S10—S13—r1.

When R5 is energized, current is allowed to pass from the limit switch 263 through the microswitches 199—199a, b, and c and through relays R5, R4, and R3 to the main driving motor 224. The motor 224 is energized from switch 263 through circuit p1—199—199a—199b—199c — q1 — S8—s1—S14—t1—S15—u1—224—s—h—S3—j—a. Motor 224 is a full capacitor motor which is reversed by relay R8. The motor as now operating will run in reverse direction. This will cause the shifting mechanism for clutches 223—223a to operate as described hereinbefore which will result in causing one or the other of the clutches 223 or 223a to engage a respective spool 217 or 217a. Rotation of the shaft 257 will, through cam 260, cause switch 263 to again open and for a moment the current path to motor 224 is from switch 263 through circuit v1—S14—t1. The motor will continue to reverse until the clutch switch 339 is closed by cam 338 on shaft 257. When switch 339 closes, current then flows to the coil of relay R8 through circuit t—w1—x1—336—y1—339—z1—343—a2—S17—b2 to relay R8. The closing of relay R8 then operates contacts S15 to reverse the motor 224 to the forward direction whereupon the tool-supporting head mechanism is caused to swing through its predetermined arc to abrade the surface of the lens blank 135 to the predetermined depth of 1 millimeter as established by the first micrometer feed scale 182. At the start of the cutting cycle, the quadrant-shaped plate 64 swings to a position where the switch control plate 79 will urge the roller 269 on the end of the slide rod 268 inwardly and thus move the slide rod 268 inwardly to thus cause switch 267 to be opened. At the completion of the cutting stroke the rod 262 will have moved to a position where the switch 267 will be closed. When switch 267 is closed at the end of the cutting stroke as described above, this will cause the motor 224 to again reverse. Closing of switch 267 will energize relay R3 and close contact S6 which will thus cause relay R7 to be energized as described above. Energizing of relay R7 will operate contact S17 and thus break the circuit to relay R8, de-energizing relay R8 and returning contact S15 to normal position whereupon motor 224 will reverse direction. Reversal of motor 224 then will cause rotation of shaft 257 which will function to again return the clutches 223 and 223a to a neutral position as previously described.

Simultaneously with the operation of the clutch shifting mechanism is operation of the chuck control mechanism which functions to turn the chuck off. Then the feed mechanism of the machine can function as described above to advance the work in the direction of the tool a predetermined amount which, in the example set forth herein, is 1 millimeter in accordance with the reading of the second micrometer feed scale 182a. The machine will continue to operate successively in the manner above described until the finish cut is made when the last micrometer feed switch 199c opens whereupon a relay R9 is energized through circuit t—y—S6—z—p1—199—199a — 199b — 199c — c2—R9—d2—s—h—S3—j—a. Since the switch 199c is only momentarily opened and will not retain R9 energized as desired at this time, it is necessary that relay R9 be locked in through circuit t—e2—S18—c2—R9—d2—s—h—S3—j—a. When the clutches 223—223a are in neutral position and the magnetic chuck is turned off as described, current is then able to pass from the switch 263 through circuit f1 — S11—g1—f2—S19—g2—S9—S21—h2—R6—k1—s—h—S3—j—a. Relay R6 thus being energized causes contact S20 and switch S31 to be opened which stops motor 178.

Since it is possible that an attempt might be made to operate the machine when the limit switch 267 is not closed, this problem is met by running a circuit j2 from the switch 339 to relay R3. This sets up the same conditions and accomplishes the same results previously described when switch 267 is closed.

*Semiautomatic cycle*

It is to be understood that the micrometer feed device can be operated manually if desired, in which case push button 305 will not be operated and switch S12 will be manually opened by operation of push button 303 in switch box 302. This will place the micrometer feed device and automatic chuck control means out of the automatic electrical circuit. The tool-supporting head meanwhile will be automatically swung about the axis of the pivot post 37 upon operation of push button 321 which will cause the clutch mechanism to operate to swing the head in one sweep only, after which the swinging movement will be stopped by the automatic neutralizing of the clutches 223—223a. Then after the micrometer feed has been manually reset to provide the required depth of cut for the next cutting cycle, the operator will again press push button 321 which will operate the clutches to cause the head to be swung in the opposite direction. This procedure may be repeated the required number of times necessary to produce the desired surface on the lens blank being abraded.

A machine constructed, arranged and operated substantially as described may be used to automatically or semi-automatically perform a succession of abrading operations on the surface of an article such as a lens blank to provide said surface with a predetermined curvature having a surface texture such as will require only a final polishing operation to complete the finished surface. Such a machine will abrade the surface being formed in a relatively short period of time and with a minimum of manual operations, and the resultant surface may be accurately formed to the desired single or compound curvature. Such a machine further embodies means for maintaining substantially constant controlled pressure upon the abrading tool during an abrading operation whereby the tool will function more efficiently and its life will be greatly increased. Loss of articles due to chipping and breakage during abrading is also materially reduced.

It will be apparent, however, that many changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

We claim:

1. In a machine of the character described the combination of a head for supporting a tool, a head for supporting work for operative engagement with said tool, and motion transfer means for moving one of said heads transversely relative to the other to cause transverse motion between the tool and work along a controlled path of movement, and means acting on said motion transfer means to cause said tool to be fed through the work at a substantially constant speed whereby it will have a substantially constant unit pressure on the work throughout the length of said path of movement.

2. In a machine of the character described the combination of a head for supporting a tool, a head for supporting work for operative engagement with said tool and motion transfer means for moving one of said heads relative to the other to cause transverse motion between the tool and work along a controlled path of movement, means acting on said motion transmer means to maintain a substantially constant speed of feed throughout said path of movement and embodying means for relieving said feed if the travel of the tool relative to the work is interrupted.

3. In a machine of the character described comprising a head for supporting a tool and a head for supporting work for operative engagement with said tool, driving means for feeding said tool transversely through said work along a controlled path of movement with a substantially constant unit pressure of said tool on said work throughout said path of movement and at a rate of speed relatively constant with respect to unit resistance of the work on said tool, and means releasing the effect of said driving means when said unit resistance exceeds a predetermined amount.

4. In a machine of the character described the combination of a head for supporting a tool, a head for supporting work for operative engagement with said tool, motion transfer means for moving one of said heads relative to the other to cause transverse motion between the tool and work along a controlled path of movement, means cooperating with said motion transfer means as to maintain a substantially constant speed of feed throughout said path of transverse movement, and advancing means connected with one of said heads for introducing a controlled amount of movement of said tool and work toward each other whereby the transverse movement will cause the surface of said work to be removed by said tool to a depth in accordance with the amount of advance movement.

5. A machine of the character described comprising a base, a work head on said base for supporting an article in position for abrasion of a surface thereof, a tool head on said base adjacent said work head for supporting a tool, one of said heads being mounted for pivotal movement on the base, automatic driving means operatively connected with said head for causing pivotal movement thereof relative to the other of said heads to cause transverse movement between the tool and article in a controlled arcuate path, and advancing means operated by the driving means for introducing a controlled amount of movement of said article and tool toward each other in response to the transverse movement between the tool and article to cause the surface of said article to be removed by said tool to a desired depth, said depth being in accordance with the amount of advance movement.

6. A machine of the character described comprising a base, a work head on said base for supporting an article in position for abrasion of a surface thereof, a tool head pivotal on said base adjacent said work head, automatic driving means operatively connected with said tool head for causing pivotal movement of said tool head so as to swing a tool carried thereby in reverse directions in an arcuate path transversely of said article, and advancing means connected with said work-supporting head for moving said article controlled amounts into the path of movement of said tool whereby the surface of said article may be abraded by said tool to a depth in accordance with the amount of advancement thereof by said advancing means, said automatic driving means comprising a pair of drive cables connected to opposed sides of said tool head, a drive shaft connected with said cables, means whereby when said shaft is rotated one or the other of the cables will be pulled thereby to cause swinging movement of said tool head, and an electric motor operatively connected with said drive shaft for causing rotation of said drive shaft and consequently causing swinging movement of said tool head and tool carried thereby.

7. A machine of the character described comprising a base, a work head on said base for supporting an article in position for abrasion of a surface thereof, a tool head pivotal on said base adjacent said work head, automatic driving means operatively connected with said tool head for causing pivotal movement of said tool head so as to swing a tool carried thereby in an arcuate path transversely of said article, and advancing means connected with said work-supporting head for moving said article controlled amounts into the path of movement of said tool whereby the surface of said article may be abraded by said tool to a depth in accordance with the amount of advancement thereof by said advancing means, said automatic driving means comprising an electric motor, a drive shaft connected with and rotatable by said motor, clutch means carried by said drive shaft, and a pair of drive cables connected with said drive shaft through said clutch means and also connected to opposed sides of said tool head whereby when said motor is operated consequent rotation of said drive shaft will be transmitted through said clutch means to said cables for causing swinging movement of said tool head.

8. A machine of the character described comprising a base, a work head on said base for supporting an article in position for abrasion of a surface thereof, a tool head pivotal on said base adjacent said work head, automatic driving means operatively connected with said tool head for causing pivotal movement of said tool head so as to swing a tool carried thereby in an arcuate path transversely of said article, and advancing means connected with said work-supporting head for moving said article controlled amounts into the path of movement of said tool whereby the surface of said article may be abraded by said tool to a depth in accordance with the amount of advancement thereof by said advancing means, said automatic driving means comprising an electric motor, a drive shaft connected with and rotatable by said motor, a pair of clutch devices attached to said drive shaft, shifting means for said clutch devices whereby said clutch devices will be selectively operatively connected to said drive shaft, and a pair of drive cables connected with said respective clutch devices, said cables being respectively connected with the opposed sides of said tool head whereby when said motor is operated the tool head and tool carried thereby will be swung in a direction in accordance with the particular clutch device which is operatively connected with said drive shaft.

9. A machine of the character described comprising a base, a work head on said base for supporting an article in position for abrasion of a surface thereof, a tool head pivotal on said base adjacent said work head, automatic driving means operatively connected with said tool head for causing pivotal movement of said tool head so as to swing a tool carried thereby in an arcuate path transversely of said article, and advancing means connected with said work-supporting head for moving said article controlled amounts into the path of movement of said tool whereby the surface of said article may be abraded by said tool to a depth in accordance with the amount of advancement thereof by said advancing means, said automatic driving means comprising a pair of drive cables connected to opposed sides of said tool head, a drive shaft connected with said cables whereby when said shaft is rotated one or the other of the cables will be pulled thereby to cause swinging movement of said tool head, an electric motor operatively connected with said drive shaft for causing rotation of said drive shaft and consequently causing swinging movement of said tool head and tool carried thereby, and control means for maintaining substantially constant unit pressure upon said tool during an abrading process.

10. A machine of the character described comprising a base, a work head on said base for supporting an article in position for abrasion of a surface thereof, a tool head pivotal on said base adjacent said work head, automatic driving means operatively connected with said tool head for causing pivotal movement of said tool head so as to swing a tool carried thereby in an arcuate path transversely of said article, and advancing means connected with said work-supporting head for moving said article controlled amounts into the path of movement of said tool whereby the surface of said article may be abraded by said tool to a depth in accordance with the amount of advancement thereof by said advancing means, said automatic driving means comprising an electric motor, a drive shaft connected with and rotatable by said motor, a pair of clutch devices attached to said drive shaft, shifting means for said clutch devices whereby only one of said clutch devices will be operatively connected at a time to said drive shaft, a pair of drive cables connected with said respective clutch devices, said cables being respectively connected with the opposed sides of said tool head whereby when said motor is operated the tool head and tool carried thereby will be swung in a direction in accordance with the particular clutch device which is operatively connected with said drive shaft, and control means for maintaining substantially constant unit pressure upon said tool during an abrading process comprising a cam surface on said tool head over which said cables are extended, said cam surface being of a predetermined curvature such as will permit said tool head to be swung at a controlled substantially constant rate of speed as it is swung by said automatic driving means.

11. A surfacing machine comprising a base having a work-supporting head fixedly secured adjacent one end thereof and having a tool-supporting head pivotally mounted thereon adjacent said work-supporting head, driving means connected with said tool-supporting head for causing rotary movement of said tool-supporting head about its pivotal mounting, an abrading tool carried by said tool-supporting head and movable therewith in a predetermined arcuate path, means carried by said tool-supporting head for rotating said tool, and adjustment means carried by said work-supporting head operatively connected with said driving means for movement of an article to be abraded into the arcuate path of movement of said tool and further means controlling the extent of said movement and consequent depth of the abrading action of the tool on the article.

12. A machine of the character described comprising a base, a work head on said base for supporting an article in position for abrasion of a surface thereof, a tool head pivotal on said base adjacent said work head, driving means operatively connected with said tool head for causing pivotal movement of said tool head so as to swing a tool carried thereby in an arcuate path transversely of said article, and advancing means connected with said work-supporting head and operated in response to transverse movement of the tool head for automatic advancement of said article controlled amounts into the path of movement of said tool whereby the surface of said article may be abraded by said tool to a controlled depth.

13. A machine of the character described comprising a base, a work head on said base for supporting work in position for abrasion of a surface thereof, a tool head pivotal on said base adjacent said work head, automatic driving means operatively connected with said tool head for causing pivotal movement of said tool head so as to swing a tool carried thereby in an arcuate path transversely of said work, and micrometric advancing means connected with said work-supporting head for advancement of said work controlled amounts into the path of movement of said tool in accordance with the amount of material to be removed from the surface of said work, said advancing means comprising a drive member effectively engaging the article to be abraded, a plurality of individually adjustable control members connected to and adapted to move with said drive member, and electrical drive means connected with said drive member and with said control members for moving said drive member to cause advancement of the article predetermined amounts into the path of movement of the tool in accordance with the initial adjustments of said control members.

14. A machine of the character described comprising a base, a work head on said base for supporting work in position for abrasion of a surface thereof, a tool head pivotal on said base adjacent said work head, automatic driving means operatively connected with said tool head for causing pivotal movement of said tool head so as to swing a tool carried thereby in an arcuate path transversely of said work, and micrometric advancing means connected with said work-supporting head for advancement of said work controlled amounts into the path of movement of said tool in accordance with the amount of material to be removed from the surface of said work, said advancing means comprising a drive member effectively engaging the article to be abraded, a plurality of individually adjustable control members connected to and adapted to move with said drive member, electrical drive means connected with said drive member and with said control members for moving said drive member to cause advancement of the article predetermined amounts into the path of movement of the tool in accordance with the initial adjustments of said control members, and means for disengaging said electrical drive means from said drive member to permit manual manipulation of said drive member.

15. A surfacing machine comprising a base having a work-supporting head fixedly secured adjacent one end thereof and having a slideway extending in a direction longitudinally thereof, a slide member on said slideway movable toward and away from said work-supporting head, a rotatable portion pivotally secured to said slide member for movement about an axis disposed normal to the direction in which said slide member is movable and having a second slideway thereon, a second slide member mounted on said second slideway movable toward and away from said axis and having a tool-supporting head pivotally attached thereto for movement about a second axis disposed substantially parallel to said first axis, a cupped type abrading tool having its effective abrading surface in the form of an arc with its center coaxial with said second axis whereby the tool may be moved about said second axis as a center to different angular positions, means carried by said tool-supporting head for rotating said tool, automatic driving means operatively connected with said tool head for moving said tool head about said first axis so as to swing said tool carried thereby in an arcuate path transversely of an article to be abraded, and adjustment means carried by said work-supporting head for selective automatic or manual advancement of said article to be abraded into alignment with the effective abrading portion of the tool and for controlling the depth of the abrading action of the tool on the article, whereby the tool may be swung about the first axis as a center to cause the effective abrading portion of the tool during the rotation thereof to move transversely of the article and cause the shape of the resulting abraded surface on said article to have a curvature in one meridian thereof controlled by the adjusted angle of the tool about the second axis and in the major meridian thereof controlled by the arc of swing of the tool about said first axis.

16. A surfacing machine comprising a base having a work-supporting head fixedly secured adjacent one end thereof and having a slideway extending in a direction longitudinally thereof, a slide member on said slideway movable toward and away from said work-supporting head, a rotatable portion pivotally secured to said slide member for movement about an axis disposed normal to the direction in which said slide member is movable and having a second slideway thereon, a second slide member mounted on said second slideway movable toward and away from said axis and having a tool-supporting head pivotally attached thereto for movement about a second axis disposed substantially parallel to said first axis, a cupped type abrading tool having its effective abrading surface in the form of an arc with its center coaxial with said second axis whereby the tool may be moved about said second axis as a center to different angular positions, means carried by said tool-supporting head for rotating said tool, automatic driving means operatively connected with said tool head for moving said tool head about said first axis so as to swing said tool carried thereby in an arcuate path transversely of an article to be abraded, and micrometric advancing means carried by said work-supporting head for selective automatic or manual advancement of said article to be abraded into alignment with the effective abrading portion of the tool and for controlling the depth of the abrading action of the tool on the article, whereby the tool may be swung about the first axis as a center to cause the effective abrading portion of the tool during the rotation thereof to move transversely of the article and cause the shape of the resulting abraded surface on said article to have a curvature in one meridian thereof controlled by the adjusted angle of the tool about the second axis and in the major meridian thereof controlled by the arc of swing of the tool about said first axis, said advancing means comprising a drive member effectively engaging the article to be abraded, a plurality of individually adjustable control members connected to and adapted to move with said drive member, and electrical drive means connected with said drive member and with said control members for moving said drive member to cause advancement of the article predetermined amounts into the path of movement of the tool in accordance with the initial adjustments of said control members.

17. A surfacing machine comprising a base having a work-supporting head fixedly secured adjacent one end thereof and having a slideway extending in a direction longitudinally thereof, a slide member on said slideway movable toward and away from said work-supporting head, a rotatable portion pivotally secured to said slide member for movement about an axis disposed normal to the direction in which said slide member is movable and having a second slideway thereof, a second slide member mounted on said second slideway movable toward and away from said axis and having a tool-supporting head pivotally attached thereto for movement about a second axis disposed substantially parallel to said first axis, a cupped type abrading tool having its effective abrading surface in the form of an arc with its center coaxial with said second axis whereby the tool may be moved about said second axis as a center to different angular positions, means carried by said tool-supporting head for rotating said tool, automatic driving means operatively connected with said tool head for moving said tool head about said first axis so as to swing said tool carried thereby in an arcuate path transversely of an article to be abraded, and micrometric advancing means carried by said work-supporting head for moving an article to be abraded into alignment with the effective abrading portion of the tool and for controlling the depth of the abrading action of the tool on the article, whereby the tool may be swung about the first axis as a center to cause the effective abrading portion of the tool during the rotation thereof to move transversely of the article and cause the shape of the resulting abraded surface on said article to have a curvature in one meridian thereof controlled by the adjusted angle of the tool about the second axis and in the major meridian thereof controlled by the arc of swing of the tool about said first axis, said automatic driving means comprising an electric motor connected with said tool head and adapted when operated to swing the tool head in either direction to move the tool in said predetermined arcuate path across the article whereby the article will be abraded during each swinging movement of the tool head and tool carried thereby.

18. A surfacing machine comprising a base having a work-supporting head fixedly secured adjacent one end thereof and having a slideway extending in a direction longitudinally thereof, a slide member on said slideway movable toward and away from said work-supporting head, a rotatable portion pivotally secured to said slide member for movement about an axis disposed normal to the direction in which said slide member is movable and having a second slideway thereon, a second slide member mounted on said second slideway movable toward and away from said axis and having a tool-supporting head pivotally attached thereto for movement about a second axis disposed substantially parallel to said first axis, a cupped type abrading tool having its effective abrading surface in the form of an arc with its center coaxial with said second axis whereby the tool may be moved about said second axis as a center to different angular positions, means carried by said tool-supporting head for rotating said tool, automatic driving means operatively connected with said tool head for moving said tool head about said first axis so as to swing said tool carried thereby in an arcuate path transversely of an article to be abraded, and micrometric advancing means carried by said work-supporting head for moving an article to be abraded into alignment with the effective abrading portion of the tool and for controlling the depth of the abrading action of the tool on the article, whereby the tool may be swung about the first axis as a center to cause the effective abrading portion of the tool during the rotation thereof to move transversely of the article and cause the shape of the resulting abraded surface on said article to have a curvature in one meridian thereof controlled by the adjusted angle of the tool about the second axis and in the major meridian thereof controlled by the arc of swing of the tool about said first axis, said automatic driving means comprising a pair of drive cables connected to opposed sides of said tool head, a drive shaft connected with said cables whereby when said shaft is rotated one or the other of the cables will be pulled thereby to cause swinging movement of said tool head, and an electric motor operatively connected with said drive shaft for causing rotation of said drive shaft and consequently causing swinging movement of said tool head and tool carried thereby.

19. A surfacing machine comprising a base having a work-supporting head fixedly secured adjacent one end thereof and having a slideway extending in a direction lontudinally thereof, a slide member on said slideway movable toward and away from said work-supporting head, a rotatable portion pivotally secured to said slide member for movement about an axis disposed normal to the direction in which said slide member is movable and having a second slideway thereon, a second slide member mounted on said second slideway movable toward and away from said axis and having a tool-supporting head pivotally attached thereto for movement about a second axis disposed substantially parallel to said first axis, a cupped type abrading tool having its effective abrading surface in the form of an arc with its center coaxial with said second axis whereby the tool may be moved about said second axis as a center to different angular positions, means carried by said tool-supporting head for rotating said tool, automatic driving means operatively connected with said tool head for moving said tool head about said first axis so as to swing said tool carried thereby in an arcuate path transversely of an article to be abraded, and micrometric advancing means carried by said work-supporting head for moving an article to be abraded into alignment with the effective abrading portion of the tool and for controlling the depth of the abrading action of the tool on the article, whereby the tool may be swung about the first axis as a center to cause the effective abrading portion of the tool during the rotation thereof to move transversely of the article and cause the shape of the resulting abraded surface on asid article to have a curvature in one meridian thereof controlled by the adjusted angle of the tool about the second axis and in the major meridian thereof controlled by the arc of swing of the tool about said first axis, said automatic driving means comprising an electric motor, a drive shaft connected with and rotatable by said motor, clutch means carried by said drive shaft, and a pair of drive cables connected with said clutch means and also connected to opposed sides of said tool head whereby operation of said motor will rotate said drive shaft and operate said clutch means and cables to cause swinging movement of said tool head.

20. A surfacing machine comprising a base having a work-supporting head fixedly secured adjacent one end thereof and having a slideway extending in a direction longitudinally thereof, a slide member on said slideway movable toward and away from said work-supporting head, a rotatable portion pivotally secured to said slide member for movement about an axis disposed normal to the direction in which said slide member is movable and having a second slideway thereon, a second slide member mounted on said second slideway movable toward and away from said axis and having a tool-supporting head pivotally attached thereto for movement about a second axis disposed substantially parallel to said first axis, a cupped type abrading tool having its effective abrading surface in the form of an arc with its center coaxial with said second axis whereby the tool may be moved about said second axis as a center to different angular positions, means carried by said tool-supporting head for rotating said tool, automatic driving means operatively connected with said tool head for moving said tool head about said first axis so as to swing said tool carried thereby in an arcuate path transversely of an article to be abraded, and micrometric advancing means carried by said work-supporting head for moving an article to be abraded into alignment with the effective abrading portion of the tool and for controlling the depth of the abrading action of the tool on the article, whereby the tool may be swung about the first axis as a center to cause the effective abrading portion of the tool during the rotation thereof to move transversely of the article and cause the shape of the resulting abraded surface on said article to have a curvature in one meridian thereof controlled by the adjusted angle of the tool about the second axis and in the major meridian thereof controlled by the arc of swing of the tool about said first axis, said automatic driving means comprising an electric motor, a drive shaft connected with and rotatable by said motor, a pair of clutch devices attached to said drive shaft, shifting means for said clutch devices whereby only one of said clutch devices will be operatively connected at a time to said drive shaft, and a pair of drive cables connected with said respective clutch devices, said cables being respectively connected with the opposed sides of said tool head whereby when said motor is operated the tool head and tool carried thereby will be swung in a direction in accordance with the particular clutch device which is operatively connected with said drive shaft.

21. A surfacing machine comprising a base having a work-supporting head fixedly secured adjacent one end thereof and having a slideway extending in a direction longitudinally thereof, a slide member on said slideway movable toward and away from said work-supporting head, a rotatable portion pivotally secured to said slide member for movement about an axis disposed normal to the direction in which said slide member is movable and having a second slideway thereon, a second slide member mounted on said second slideway movable toward and away from said axis and having a tool-supporting head pivotally attached thereto for movement about a second axis disposed substantially parallel to said first axis, a cupped type abrading tool having its effective abrading surface in the form of an arc with its center coaxial with said second axis whereby the tool may be moved about said second axis as a center to different angular positions, means carried by said tool-supporting head for rotating said tool, automatic driving means operatively connected with said tool head for moving said tool head about said first axis so as to swing said tool carried thereby in an arcuate path transversely of an article to be abraded, and micrometric advancing means carried by said work-supporting head for moving an article to be abraded into alignment with the effective abrading portion of the tool and for controlling the depth of the abrading action of the tool on the article, whereby the tool may be swung about the first axis as a center to cause the effective abrading portion of the tool during the rotation thereof to move transversely of the article and cause the shape of the resulting abraded surface on said article to have a curvature in one meridian thereof controlled by the adjusted angle of the tool about the second axis and in the major meridian thereof controlled by the arc of swing of the tool about said first axis, said automatic driving means comprising an electric motor connected with said tool head and adapted when operated to swing the tool head in either direction to move the tool in said predetermined arcuate path across the article whereby the article will be abraded during each swinging movement of the tool head and tool carried thereby, and control means for maintaining substantially constant unit pressure upon said tool during an abrading process.

22. A surfacing machine comprising a base having a work-supporting head fixedly secured adjacent one end thereof and having a slideway extending in a direction longitudinally thereof, a slide member on said slideway movable toward and away from said work-supporting head, a rotatable portion pivotally secured to said slide member for movement about an axis disposed normal to the direction in which said slide member is movable and having a second slideway thereon, a second slide member mounted on said second slideway movable toward and away from said tool axis and having a tool-supporting head pivotally attached thereto for movement about a second axis disposed substantially parallel to said first axis, a cupped type abrading tool having its effective abrading surface in the form of an arc with its center coaxial with said second axis whereby the tool may be moved about said second axis as a center to different angular positions, means carried by said tool-supporting head for rotating said tool, automatic driving means operatively connected with said tool head for moving said tool head about said first axis so as to swing said tool carried thereby in an arcuate path transversely of an article to be abraded, and micrometric advancing means carried by said work-supporting head for moving an article to be abraded into alignment with the effective abrading portion of the tool and for controlling the depth of the abrading action of the tool on the article, whereby the tool may be swung about the first axis as a center to cause the effective abrading portion of the tool during the rotation thereof to move transversely of the article and cause the shape of the resulting abraded surface on said article to have a curvature in one meridian thereof controlled by the adjusted angle of the tool about the second axis and in the major meridian thereof controlled by the arc of swing of the tool about said first axis, said automatic driving means comprising a pair of drive cables connected to opposed sides of said tool head, a drive shaft connected with said cables whereby when said shaft is rotated one or the other of the cables will be pulled thereby to cause swinging movement of said tool head, an electric motor operatively connected with said drive shaft for causing rotation of said drive shaft and consequently causing swinging movement of said tool head and tool carried thereby, and control means for maintaining substantially constant unit pressure upon said tool during an abrading process, comprising a cam surface on said tool head over which said cables are extended, said cam surface being of a predetermined curvature such as will permit said tool head to be swung at a controlled substantially constant rate of speed as it is swung by said automatic driving means.

23. An automatic surfacing machine of the character described comprising a base, a tool head pivotal on said base, driving means operatively connected with said tool head for causing pivotal movement thereof so as to swing a tool carried thereby in a predetermined arcuate path, a magnetic chuck mounted on said base adjacent said tool head for supporting work to be abraded by said tool, automatic micrometric advancing means adjacent said chuck for moving said work in successive steps predetermined amounts into the path of movement of said tool, and control means for said chuck operable by said automatic micrometric advancing means for alternately turning the chuck on and off intermittently with the successive advancing movements of the work by said advancing means whereby said work will be held in said chuck during successive abrading operations thereon by said tool and will be permitted to move in response to said advancing means between each of said abrading operations.

24. An automatic surfacing machine of the character described comprising a base, a tool head pivotal on said base, automatic driving means operatively connected with said tool head for causing pivotal movement thereof so as to swing a tool carried thereby in a predetermined arcuate path and comprising a pair of drive cables connected to opposed sides of said tool head, a drive shaft connected with said cables, and a motor connected with said drive shaft for causing rotation thereby whereby swinging movement of said head in either direction will be imparted thereto through said cables, a magnetic chuck mounted on said base adjacent said tool head for supporting work to be abraded by said tool, automatic micrometric advancing means adjacent said chuck for moving said work in successive steps predetermined amounts into the path of movement of said tool, and control means for said chuck operable by said automatic micrometric advancing means and said automatic driving means for alternately turning the chuck on and off intermittently with the successive advancing movements of the work by said advancing means whereby said work will be held in said chuck during successive abrading operations thereon by said tool and will be permitted to move in response to said advancing means between each of said abrading operations.

25. An automatic surfacing machine of the character described comprising a base, a tool head pivotal on said base, automatic driving means operatively connected with said tool head for causing pivotal movement thereof so as to swing a tool carried thereby in a predetermined arcuate path and comprising an electric motor, a drive shaft connected with and rotatable by said motor, clutch means carried by said drive shaft, and drive cables connected with said clutch means and with said tool head whereby operation of said motor will rotate said drive shaft and consequent operation of said clutch means will transmit motion through said cables to cause said tool head and tool to swing in either direction, a magnetic chuck mounted on said base adjacent said tool head for supporting work to be abraded by said tool, automatic micrometric advancing means adjacent said chuck for moving said work in successive steps predetermined amounts into the path of movement of said tool, and control means for said chuck operable by said automatic micrometric advancing means and said automatic driving means for alternately turning the chuck on and off intermittently with the successive advancing movements of the work by said advancing means whereby said work will be held in said chuck during successive abrading operations thereon by said tool and will be permitted to move in response to said advancing means between each of said abrading operations.

26. An automatic surfacing machine of the character described comprising a base, a tool head pivotal on said base, automatic driving means operatively connected with said tool head for causing pivotal movement thereof so as to swing a tool carried thereby in a predetermined arcuate path and comprising an electric motor, a drive shaft connected with and rotatable by said motor, clutch means carried by said drive shaft, and drive cables connected with said clutch means and with said tool head whereby operation of said motor will rotate said drive shaft and consequent operation of said clutch means will transmit motion through said cables to cause said tool head and tool to swing in either direction, a magnetic chuck mounted on said base adjacent said tool head for supporting work to be abraded by said tool, automatic micrometric advancing means adjacent said chuck for moving said work in successive steps predetermined amounts into the path of movement of said tool, control means for said chuck operable by said automatic micrometric advancing means and said automatic driving means for alternately turning the chuck on and off intermittently with the successive advancing movements of the work by said advancing means whereby said work will be held in said chuck during successive abrading operations thereon by said tool and will be permitted to move in response to said advancing means between each of said abrading operations, and electrical control means for initially causing operation of said advancing means to move said work a predetermined distance into the path of movement of the tool in accordance with the amount of material to be removed from the surface thereof, rendering inoperative of said advancing means, turning on said chuck, operating said driving means to cause the tool to swing and to abrade the work, rendering inoperative the driving means, turning off the chuck, and repeating the foregoing cycle a predetermined number of times to cause abrasion of the work in successive steps.

27. A machine of the character described comprising a base, a work head on said base for supporting an article in position for abrasion of a surface thereof, a tool head pivotal on said base adjacent said work head, automatic driving means operatively connected with said tool head for causing pivotal movement of said tool head so as to swing a tool carried thereby in an arcuate path transversely of said article, and advancing means connected with said work-supporting head for moving said article controlled amounts into the path of movement of said tool whereby the surface of said article may be abraded by said tool to a depth in accordance with the amount of advancement thereof by said advancing means, said automatic driving means including a drive cable connected in axial offset relation to said tool head, a pulling force connected with said cable to cause swinging movement of said tool head and tool carried thereby, and control means acting on said cable for maintaining substantially constant unit pressure upon said tool during an abrading process.

28. A machine of the character described comprising a base, a work head on said base for supporting an article in position for abrasion of a surface thereof, a tool head pivotal on said base adjacent said work head, automatic driving means operatively connected with said tool head for causing pivotal movement of said tool head so as to swing a tool carried thereby in an arcuate path transversely of said article, and advancing means connected with said work-supportnig head for moving said article controlled amounts into the path of movement of said tool whereby the surface of said article may be abraded by said tool to a depth in accordance with the amount of advancement thereof by said advancing means, said automatic driving means including a drive cable operable by a pulling force and connected in axial offset relation to said tool head to cause swinging movement of said tool head and tool carried thereby, means acting on said cable for maintaining substantially constant unit pressure upon said tool during an abrading process, and means for interrupting the pulling force on said drive cable when some circumstance occurs to impede the swinging movement of the tool-supporting head.

29. A machine of the character described comprising a base, a work head on said base for supporting an article in position for abrasion of a surface thereof, a tool head pivotal on said base adjacent said work head, automatic driving means operatively connected with said tool head for causing pivotal movement of said tool head so as to swing a tool carried thereby in an arcuate path transversely of said article, and advancing means connected with said work-supporting head for moving said article controlled amounts into the path of movement of said tool whereby the surface of said article may be abraded by said tool to a depth in accordance with the amount of advancement thereof by said advancing means, said automatic driving means including a drive cable operable by a pulling force and connected to said tool head for causing swinging movement of said tool head and tool carried thereby, guide means acting on said drive cable for maintaining substantially constant unit pressure upon said tool during an abrading process, and tension control means acting on said pulling force and releasable to interrupt said pulling force as a safety device when circumstance requires.

30. A machine of the character described comprising a base, a work head on said base for supporting work in position for abrasion of a surface thereof, a tool head pivotal on said base adjacent said work head, means operatively connected with said tool head for causing pivotal movement of said tool head so as to swing a tool carried thereby in an arcuate path transversely of said work, and advancing means connected with said work-supporting head for advancement of said work controlled amounts into the path of movement of said tool in accordance with the amount of materials to be removed from the surface of said work, said advancing means comprising a drive member effectively engaging the article to be abraded, adjustable control mechanism connected to and adapted to move with said drive member, and means connected with said drive member and with said control mechanism for moving said drive member to cause advancement of the article into the path of movement of the tool in accordance with the initial adjustment of said control mechanism.

31. A machine of the character described comprising a base, a work head on said base for supporting work in position for abrasion of a surface thereof, a tool head pivotal on said base adjacent said work head, means operatively connected with said tool head for causing pivotal movement of said tool head so as to swing a tool carried thereby in an arcuate path transversely of said work, and advancing means connected with said work-supporting head for advancement of said work controlled amounts into the path of movement of said tool in accordance with the amount of material to be removed from the surface of said work, said advancing means comprising a drive member effectively engaging the article to be abraded, adjustable control mechanism connected to and adapted to move with said drive member, driving means connected with said drive member and with said control mechanism for moving said drive member to cause advancement of the article predetermined amounts into the path of movement of the tool in accordance with the initial adjustment of said control mechanism, and means for disengaging driving means from said drive member to permit manual manipulation of said drive member.

32. A machine of the character described comprising a base, a work head on said base for supporting work in position for abrasion of a surface thereof, a tool head pivotal on said base adjacent said work head, motion imparting means operatively connected with said tool head for causing pivotal movement of said tool head so as to swing a tool carried thereby in an arcuate path transversely of said work, and advancing means connected with said work-supporting head for advancement of said work controlled amounts into the path of movement of said tool in accordance with the amount of material to be removed from the surface of said work, said advancing means including a first means for effectively moving the article to be abraded into said path, adjustable control mechanism associated therewith to control the extent of said movement and drive means connecting said first means with the motion imparting means for the tool head to cause advancement of the article into the said path of movement of the tool in accordance with the adjustment of said control mechanism and so automatically control the abrading action of the tool on the work.

33. A machine of the character described comprising a base, a work head on said base for supporting work in position for abrasion of a surface thereof, a tool head pivotal on said base adjacent said work head, motion imparting means operatively connected with said tool head for causing pivotal movement of said tool head so as to swing a tool carried thereby in an arcuate path transversely of said work, and advancing means connected with said work-supporting head for advancement of said work controlled amounts into the path of movement of said tool in accordance with the amount of material to be removed from the surface of said work, said advancing means including a first means for effectively moving the article to be abraded into said path of the tool, adjustable control mechanism connected to and adapted to move with said drive member, drive means connected with said drive member and with said control members for moving said drive member to cause advancement of the article predetermined amounts into the path of movement of the tool in accordance with the initial adjustments of said control members, and means for disengaging said drive means from said drive member to permit manual manipulation of said drive member.

References Cited in the file of this patent

UNITED STATES PATENTS

| | | |
|---|---|---|
| 2,414,126 | Sevin | Jan. 14, 1947 |
| 2,548,418 | Bernheim | Apr. 10, 1951 |
| 2,553,528 | D'Avaucourt | May 15, 1951 |
| 2,633,675 | Ellis | Apr. 7, 1953 |

FOREIGN PATENTS

| | | |
|---|---|---|
| 363,544 | Great Britain | Dec. 24, 1931 |